United States Patent
Vondran, Jr. et al.

[11] Patent Number: 5,940,585
[45] Date of Patent: Aug. 17, 1999

[54] DATA MERGE UNIT

[75] Inventors: Gary L. Vondran, Jr., Winchester, Mass.; James R. Nottingham, Boise, Id.

[73] Assignee: Hewlett-Packard Company, Palo Alto, Calif.

[21] Appl. No.: 08/877,346

[22] Filed: Jun. 17, 1997

[51] Int. Cl.[6] .................................................. G06F 15/00
[52] U.S. Cl. ........................ 395/114; 382/239; 358/430
[58] Field of Search ..................................... 395/114, 112, 395/109, 101, 115, 116, 117, 200.77; 358/426, 428, 429, 430, 296, 261.4, 261.1, 261.2, 261.3, 427, 262.1, 431, 432, 433, 462, 425, 450; 382/237, 239, 244, 232, 234, 235, 233, 240, 248, 251, 284, 303

[56] References Cited

U.S. PATENT DOCUMENTS

| | | | |
|---|---|---|---|
| 5,225,911 | 7/1993 | Buckley et al. | 358/296 |
| 5,541,594 | 7/1996 | Huang et al. | 341/51 |
| 5,552,898 | 9/1996 | Deschuytere | 358/426 |
| 5,754,746 | 5/1998 | Blurfrushan et al. | 395/114 |

FOREIGN PATENT DOCUMENTS

| | | | |
|---|---|---|---|
| 0662772A3 | 7/1995 | European Pat. Off. | H04N 7/24 |
| WO 92/09142 | 5/1992 | WIPO | H03M 7/30 |

OTHER PUBLICATIONS

European Search Report, Application Number EP 98 10 5563, Dec. 21, 1998, pp. 1–3.

*Primary Examiner*—Dov Popovici
*Attorney, Agent, or Firm*—Gregg W. Wisdom

[57] ABSTRACT

A print data processing pipeline for use in a color electrophotographic printer optimizes print quality and minimizes memory usage by separately processing lossy and lossless print data. Lossy print data may include print data for images and lossless print data may include print data for text, line art, and graphics. Partitioning print data into lossy and lossless components allows application of the print data compression operations optimized for each type of print data. High compression ratios can be achieved on lossy print data by applying visually lossless compression operations designed for the lossy print data. In addition, high compression ratios can be achieved on the lossless print data by applying lossless compression operations designed for the lossless print data. A merge unit combines the lossy and lossless print data streams after decompression to reconstruct the original image. Placement of the color space conversion operation and the halftone operation relative to the merge operation, further optimizes the print quality while minimizing memory usage. The print data processing pipeline includes a direct memory access controller which has the capability to allow print data to be selectively directed to the lossy or lossless compressor/decompressor, the color space converter, or the merge unit. Feedback paths within the print data processing pipeline allow the results of the various operations performed to be returned to the direct memory access controller for further processing or storage in system memory. Bypass paths in the color space converter and halftone unit allow print data to be selectively directed around these operations. These capabilities allow configuration of the print data processing pipeline to perform a multitude of permutations of print data processing operations optimized for the print data.

17 Claims, 9 Drawing Sheets

DATA MERGE UNIT

CROSS REFERENCE TO RELATED APPLICATIONS

This application includes subject matter related to application entitled: "MULTI-PATH DATA PROCESSING PIPELINE" having U.S. Ser. No. 08/877,345, the patent application entitled: "METHOD AND APPARATUS FOR HALFTONING OF IMAGES IN A PRINTER" having U.S. Ser. No. 08/877,343, the patent application entitled: "CONFIGURABLE DATA PROCESSING PIPELINE" having U.S. Pat. No. 5,852,742, and the patent application entitled: "MERGE PLANE GENERATION FOR A DATA PROCESSING PIPELINE" having U.S. Ser. No. 08/877,347, each of which are incorporated by reference herein, assigned to the same assignee as this application, and filed on even date herewith.

TECHNICAL FIELD OF THE INVENTION

This invention relates to the processing of data, and more particularly to a merge unit used to merge print data in the print data processing pipeline of a printer.

BACKGROUND OF THE INVENTION

The print data pipeline of a printer performs a number of operations upon print data which enters the pipeline in preparation for printing. These operations include: print data compression, print data decompression, color space conversion, and halftoning. The type of operation performed and the specific order in which the operations will be performed can vary depending upon the type of print data which enters the pipeline, the capabilities of the print engine, and the memory available in the printer. The types of print data which may enter the pipeline include: text, line art, images, and graphics. In prior art pipeline implementations, the various processing operations are performed by a processor under the control of firmware. Depending upon the type of print data entering the pipeline, a number of possible firmware routines are executed, as necessary, to complete the aforementioned operations.

The specifics of the print data compression operation performed depend upon the type of print data which enters the pipeline. For example, with certain types of print data, such as image print data, print data compression routines which result in some loss of information are acceptable. With these types of print data, the decrease in the quality of the printed output is not perceptible. Compression routines which result in a loss of information not perceptible in the printed output are referred to as "visually lossless" systems However for other types of print data, such as text and line art, it is important, for the quality of the printed output, that the print data compression routines employed do not result in the loss of information.

Data compression/decompression systems, which are known in the art, encode a stream of digital data signals into compressed digital code signals and decode the compressed digital code signals back into the original data. Data compression refers to any process that attempts to convert data in a given format into an alternative format requiring less space than the original. The objective of data compression systems is to effect a savings in the amount of storage required to hold a given body of digital information. When that digital information is a digital representation of an image or text, data compression systems are divided into two general types: lossy, and lossless.

The lossless systems have what is referred to as reciprocity. In order for the data compression system to posses the property of reciprocity it must be possible to re-expand or decode the compressed data back into its original form without any alteration or loss of information. The decoded and original data must be identical and indistinguishable with respect to each other. Thus, the property of reciprocity is synonymous to that of strict noiselessness used in information theory.

Some applications do not require strict adherence to the property of reciprocity. As stated above, one such application in particular, is when dealing with image data. Because the human eye is not sensitive to noise, some alteration or loss of information during the compression and decompression process is acceptable. This loss of information gives the lossy data compression systems their name.

An important criteria in the design of data compression systems is the compression effectiveness, which is characterized by the compression ratio. The compression ratio is the ratio of data size in uncompressed form divided by the size in compressed in form. In order for data to be compressible the data must contain redundancy. Compression effectiveness is determined by how effectively the compression procedure uses the redundancy in the input data. In typical computer stored data, redundancy occurs both in the non-uniform usage of individual symbology, for example digits, bytes, or characters, and in frequent reoccurrence of symbol sequences, such as common words, blank record fields and the like.

The data compression system should provide sufficient performance with respect to the data rates provided by and accepted by the printer. The rate at which data can be compressed is determined by the input data processing rate of the compression system. Sufficient performance is necessary to maintain the data rates achieved and prevent interruption of printing because processed data is not available. Thus, the data compression and decompression system must have enough data bandwidth so as not to adversely effect the overall system.

Typically, the performance of data compression and decompression systems is limited by the computations necessary to compress and decompress and the speed of the system components such as random access memory and the like, utilized to store statistical data and guide the compression process. This is particularly true when the compression and decompression systems are implemented in firmware, wherein firmware guides a general purpose type central processing unit to perform the data compression and decompression process. In such a system, performance for a compression device is characterized by the number of processor cycles required per input character during compression. The fewer the number of cycles, the higher the performance. The firmware solutions are limited by the speed of the firmware compression and decompression because firmware takes several central processor unit cycles to decompress each byte. Thus, the firmware process generally was tailored to decrease compression ratios in order to increase decompression speed.

General purpose data compression procedures are known in the prior art; three relevant procedures being the Huffman method, the Tunstall method and the Lempel-Ziv method. One of the first general purpose data compression procedures developed is the Huffman method. Briefly described, the Huffman method maps full length segments of symbols into variable length words. The Tunstall method, which maps variable length symbols into fixed length binary words, is complimentary to the Huffman procedure. Like the Huffman procedure, the Tunstall procedure requires a foreknowledge of the source data probabilities. Again this foreknowledge requirement can be satisfied to some degree by utilizing an adaptive version which accumulates the statistic strength processing of the data.

The Lempel-Ziv procedure maps variable length segments of symbols into variable length binary words. It is asymptotically optimal when there are no constraints on the input or output segments. In this procedure the input data string is parsed into adaptively grown segments. Each of the segments consists of an exact copy of an earlier portion of the input string suffixed by one new symbol from the input data. The copy which is to be made is the longest possible and is not constrained to coincide with an earlier parsed segment. The code word which represents the segment in the output contains information consisting of a pointer to where there earlier copy portions begin, the length of the code, and the new symbol. Additional teaching for the Lempel-Ziv data compression technique can be found in the U.S. Pat. No. 4,558,302 incorporated herein by reference.

While the aforementioned data compression procedures are good general purpose lossless procedures, some specific types of redundancy may be compressed using other methods. One such lossless method commonly known as run length encoding (RLE), is well suited for graphical data. With RLE, sequences of individual characters can be encoded as a count field plus an identifier of the repeated character. Typically, two characters are needed to mark each character run, so that this encoding would not be used for runs of two or fewer characters. However, when dealing with a graphical image represented in digital data form, there can be large runs of the same character in any given line making RLE an effective compression procedure for such information.

All of the aforementioned data compression procedures are highly dependent upon redundancy in the data to achieve significant compression ratios. One significant disadvantage with these procedures, is that with certain types of data, the compressed output may actually be larger than the input because input data lacks any specific redundancy. In the art of printing, such "incompressible" data is easily generated.

Certain types of images are classified as either "ordered dither" or "error diffused". An ordered dither image (also called "cluster") is a half-tone image that includes half-tone gray representations throughout the page. Such images generally reflect substantial data redundancy and lend themselves to lossless techniques of data encoding such as those described above. However, error diffused images (also called "dispersed") exhibit little redundancy in their data and require different methods of compression. Print data representing photographic images provides another example of low redundancy print data. As a result, the use of a single data compression scheme in a page printer no longer enables such a printer to handle image data. In U.S. Pat. No. 5,479,587 entitled "Page Printer Having Adaptive Data Compression For Memory Minimization", issued to Cambell et al., assigned to the same assignee as this application and incorporated herein by reference, a page printer steps through various compression techniques as outlined in an attempt to accommodate a limited memory size that is less than that required for a full page of printed data. In that application, when an image is unprintable because of memory low conditions, first a "mode-M" compression technique is used. Using this technique, an attempt is made to compress the block using run length encoding for each row and by encoding delta changes that occur from row to row within the block. If the "mode-M" compression technique is unsuccessful in providing enough of a compression ratio to allow printing of the page, a second attempt is made using an LZW type compression. Finally, if the LZW based compression technique is unsuccessful in obtaining a high enough compression ratio to allow printing of the page, a lossy compression procedure is used.

In the processing of raster print data, a variety of operations can be performed on the raster print data prior to generating the printed page. Such operations as data compression, color space conversion, and halftoning are included in the operations which may be performed prior to generating the printed page. It is frequently the case, that in the processing of raster print data various sections of the page would be optimally processed by employing different types of data compression, color space conversion, and halftoning operations. A reoccurring problem confronted in optimally processing raster print data has been the partitioning of the raster print data forming the page so that the various raster print data processing operations may be optimally performed on the appropriate sections of the page.

Consider, for example, the amount of memory required to store the raster print data corresponding to a page. As printers increase in the density of dot placement (dots per inch), add gray scale capability (using a number of bits per pixel to define a gray scale level), and include color printing capability (requiring additional bits per pixel over monochrome printing), the memory required to store the data used to print a page can reach thirty two times the memory required for monochrome printer of the same resolution. To allow the color printers to use a more reasonable memory size, data compression techniques are generally used to reduce the memory requirements. However, different types of raster print data are each optimally compressed using different compression techniques. For example, for raster print data corresponding to sections of the page containing images, the optimal combination of compression ratio and print quality is achieved by employing lossy compression techniques. However, for raster print data corresponding to sections of the page containing text the optimal combination of compression ratio and print quality is achieved by employing lossless compression techniques. A need exists for a data processing pipeline which will allow application of the optimal type of data processing operation to the processing of each data element.

SUMMARY OF THE INVENTION

A data processing pipeline for separately processing a plurality of data streams each formed from a plurality of data elements, such as bytes or words of print data, allows optimization of the data pipeline processing operations for each data element. The data processing pipeline uses a merge data stream defined by the plurality of data streams and formed of merge data elements corresponding to the data elements. The plurality of data streams may be formed, for example, by partitioning a source data stream, such as a print data stream, data element by data element, based upon the characteristics of each of the data elements. Depending upon the characteristics, the source data stream may be optimally partitioned into more than two data streams. For the case in which the data processing pipeline is used to process raster print data, the stream of raster print data may be partitioned at the pixel level. For example, those pixels associated with lossy regions of the page form the lossy raster print data stream and those pixels associated with lossless regions of the page form the lossless raster print data stream. Data processing pipeline operations, such as data compression, may then be selected to achieve the optimal combination of compression ratio and print quality for each pixel on the page.

The stream of raster print data may also be partitioned based upon the number of bits used to represent each of the pixels. In the extreme case, pixels corresponding to regions of the page which will be printed in color may require 24 bits to represent each of the pixels, while pixels corresponding to regions of the page which will be printed in black and white may only require 1 bit to represent each of the pixels. By partitioning the stream of raster print data based upon the number of bits used to represent each of the pixels, compression operations optimized for the number of bits per pixel may be used. In addition, the stream of raster print data including pixels of binary black and white data may not require a color space conversion operation, whereas the stream of raster print data including pixels of color data may require a color space conversion operation.

A further possible partition of the stream of raster print data may be based upon the desired printing resolution of the areas of the page corresponding to the pixels. For example, the edges of vector graphics objects or the edges of objects within images generally, for print quality reasons, benefit from higher resolution, while areas interior to the vector graphics objects or interior to the objects within images may be printed with lower resolution without sacrificing print quality. Partitioning a raster print data stream on the basis of resolution would allow a reduction in the amount of data requiring processing by the data processing pipeline, thereby reducing the time required to print pages. In addition, halftone and compression operations may be optimized for each of the partitioned streams of raster print data based upon the resolution of the particular partitioned raster print data stream.

A merge unit is configured to receive the plurality of data streams and the merge data stream. The merge unit uses the merge data stream to combine the plurality of data streams and generate an output data stream. For the case in which the merge unit merges lossy and lossless print data streams, the output data stream is a reconstructed representation of the image prior to partitioning into lossy and lossless print data.

The merge unit includes a first multiplexor configured to receive the plurality of data streams and the merge data stream. Each of the plurality of data streams includes a series of data elements, such as bytes or words, corresponding to each of the data elements of the other data streams. The merge data stream includes a series of merge data elements, such as words, bytes, or bits corresponding to the data elements of each of the plurality of data streams. The first multiplexor selects a data element from among the corresponding data elements in each of the plurality of data streams using the corresponding merge data elements to control the selection. The series of selected data elements output from the first multiplexor forms the output data stream.

DESCRIPTION OF THE DRAWINGS

A more thorough understanding of the invention may be had from the consideration of the following detailed description taken in conjunction with the accompanying drawings in which.

DETAILED DESCRIPTION OF THE PREFERRED EMBODIMENTS

The present invention is not limited to the specific exemplary embodiments illustrated herein. In addition, although the embodiment of the print data processing pipeline will be discussed in the context of a color laser printer, one skilled in the art will recognize after understanding this disclosure that the print data processing pipeline architecture disclosed is applicable to other imaging systems for which a performance advantage is achieved by employing parallel paths to handle data which has been selectively compressed using either lossless or lossy data compression methods. For example, the disclosed print data processing pipeline may be usefully applied in scanners and digital photoprocessing laboratories. Furthermore, any system for generating an image that requires memory for the storage of image data could achieve optimized image quality while minimizing memory requirements by applying the disclosed pipeline architecture.

In color printing, a need exists for a print data processing pipeline which reduces the memory required for storing print data while maintaining high levels of print quality. The use of a print data processing pipeline architecture which selectively compresses print data using lossy or lossless compression methods maintains high print quality while minimizing print data memory storage requirements. In addition, correct placement of the operations in the print data processing pipeline provides further improvements in print quality and reductions in memory storage requirements.

Figure 1:
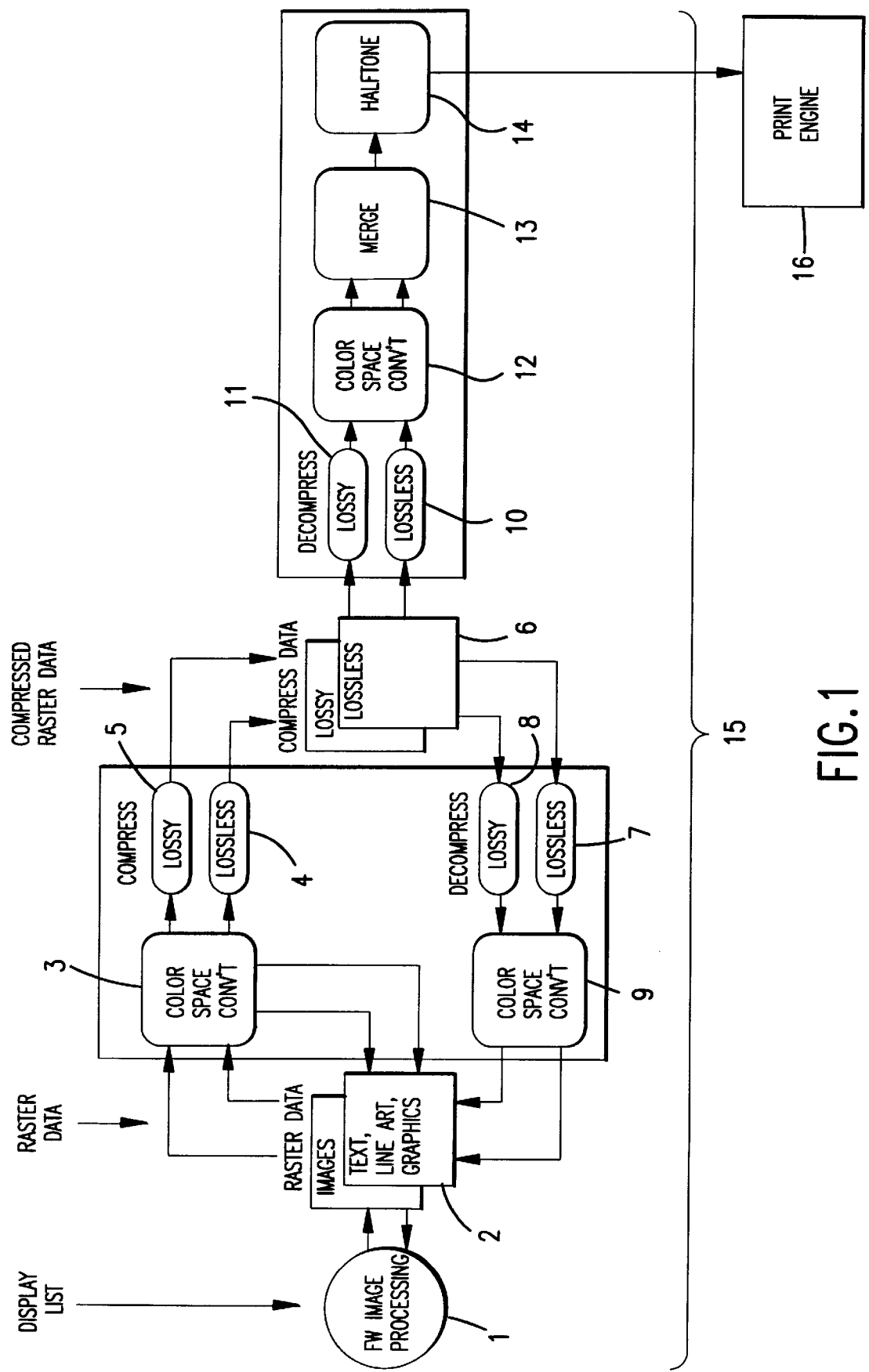
FIG. 1 is a simplified conceptual block diagram of the flow of print data through the preferred embodiment of a print data processing pipeline in a color printer.

Shown in FIG. 1 is a simplified conceptual block diagram of the flow of print data through a color printer which includes the preferred embodiment of the print data processing pipeline 15 for a color laser printer. It should be emphasized that FIG. 1 is intended to illustrate only the flow of print data, using parallel lossy and lossless paths, through typical operations performed by print data processing pipeline 15. FIG. 1 is not a hardware block diagram of the print data processing pipeline 15. As will become apparent from the later description of the hardware block diagram, the print data processing pipeline 15 may be configured in a variety of different ways to optimize processing of the print data.

The print data input to the system could come in several different formats. The input print data could be in the form of a display list, raster print data, or raster print data which has already undergone compression. The display list print data consists of the information necessary to construct the pages to be printed. Display list print data may include raster print data along with codes identifying the raster print data as text or image print data, printer control language codes representing text characters, graphics language codes representing a graphics image, or some combination of each of these types of print data. Conceptually, print data will enter the print data processing pipeline 15 at the appropriate location depending upon the processing required to transform the print data to the form necessary for generating the printed output.

Image processing is performed on display list print data in image processing operation 1 by execution of firmware routines. Included in this image processing operation 1 is the partitioning of the input into page strips. The display list print data is sorted, based upon the vertical position on the page to which it corresponds, for partitioning into page strips. The partitioning of the page into page strips in image processing operation 1 involves consideration of the type of print data forming the section of the page corresponding to the page strip which will be formed. Each page strip is formed of either one or two page strip elements. If the section of the page is formed from either entirely lossy or entirely lossless print data, only a single element of the page strip will be formed in image processing operation 1 for that section of the page. However, if the display list print data for that section includes both lossy and lossless print data, two separate page strip elements are formed for that section of the page. One of these page strip elements includes only lossy print data and the other of these page strip elements includes only lossless print data.

Formation of lossy and lossless page strip elements for the corresponding section of the page occurs when both types of data are present in the display list print data. In this case, the image processing operation 1 builds each of the two page strip elements by filling both the lossy and lossless page strip elements, pixel location by pixel location, with, as is appropriate, the lossy or lossless print data from the page section. Included within the lossy and lossless page strip elements is the print data for that section of the page. For example, if the display list print data includes lossless text print data along with lossy image print data, image processing operation 1 will separate the display list print data into the text print data and the image print data. Then, each of the lossless and lossy page strip elements will be filled, pixel location by pixel location, with the respective text print data and the image print data. In this case, the page strip corresponding to the display list print data can be regarded as a composite page strip including the page strip elements containing lossy image print data which is overlaid with a page strip element containing the lossless text print data.

For the case in which lossy and lossless page strip elements are formed, the image processing operation 1 produces a corresponding merge plane. This merge plane consists of a single bit for each pair of corresponding pixel locations in the two page strip elements for indicating in which of the lossy and lossless page strip elements the print data for that pixel is contained. The bits forming the merge plane are formed into bytes and transferred through the print data processing pipeline 15 as a stream of bytes. This merge plane is used at a later stage in the print data processing pipeline 15 to combine the lossy and lossless page strip elements so that the original page strip is reconstructed. This merge operation will be discussed in greater detail later in this specification.

For the case in which one page strip element is formed having only lossy or only lossless print data, all of the print data for that page strip is contained within that single page strip element. In addition, the merge plane associated with that page strip element is not generated by the image processing operation 1. Because there is only a single page strip element for that section of the page, every bit in the merge plane would be identical. Therefore, it is not necessary to send a merge plane consisting of bytes of all the same value through the print data processing pipeline 15. Instead of generating the merge plane in image processing operation 1, the merge plane is generated at a later stage in the print data processing pipeline 15. This will be discussed in more detail later in this specification.

Image processing operation 1 also produces a halftone plane with one value corresponding to each pixel location in the page strip As will be discussed later in this specification, each halftone value is represented by two bits and determines the halftoning operation applied to the print data corresponding to the pixel. In the event that the halftoning operations to be performed are the same for each pixel in the page strip, the halftone plane will not be generated in the image processing operation 1. Instead, the halftone plane will be generated at a later stage in the print data processing pipeline 15. This will be discussed in more detail later in this specification.

From the display list print data which has been partitioned into page strip elements, raster print data is generated corresponding to the display list print data. The resulting page strip elements of raster print data are passed through the operations of print data processing pipeline 15 as they are generated. Raster print data memory 2 is used to store raster print data generated by image processing operation 1. The memory space allocated to raster print data memory 2 is of sufficient storage capacity to contain the raster print data for two page strip elements of the maximum allowable number of lines per page strip, the corresponding size merge plane, and the corresponding size halftone plane. Each of the page strip elements is rasterized in image processing operation 1, stored in the memory space allocated to raster print data memory 2, and then sent to the next operation in the print data processing pipeline 15 to create space in raster print data memory 2 for the next page strip elements rasterized in image processing operation 1. It should be noted that in the preferred embodiment, raster print data memory 2 is not included in the integrated circuit in which the print data processing pipeline 15 is implemented.

Typically, the generated raster print data consists of three eight bit bytes for each pixel. Each of the three bytes corresponds to one of the color dimensions in the color space in which the display list print data is expressed. For the color printer in which the preferred embodiment of the print data processing pipeline operates, this is an RGB color space. However, one skilled in the art will recognize that the color space of the input print data could be any color space such as, cyan, magenta, yellow, black (CMYK); hue, saturation, value (HSV); hue, lightness, saturation (HLS); luminance, red-yellow scale, green-blue scale (La*b*); luminance, red-green scale, yellow-blue scale (Luv); Luminance, red-blue scale, green-yellow scale (YCrCb); or YIQ. The generated raster print data could correspond to images, text, line art, graphics or some combination thereof.

As previously mentioned, image processing operation 1 creates the merge plane for the case in which the display list print data is such that a lossy and a lossless page strip element are formed. At a later location in the print data processing pipeline, the merge bits are used to select pixels from the pair of corresponding lossy and lossless page strip elements to combine the lossy and lossless page strip elements, while maintaining the correct spatial relationship between the pixels, into the original image.

Color space conversion is performed in color space conversion operation 3. The degree of compression achieved on the raster print data is affected by the color space in which the raster print data is expressed. For example, a higher lossy compression ratio, with equivalent image quality, can generally be achieved by performing a color space conversion from a RGB color space to a YCbCr color space and performing the lossy compression operation after conversion to the YCbCr color space. The YCbCr color space is a luminance/hue/chroma type color space in which the Cr and Cb components of the color space each include both hue and chroma information. The human eye is most sensitive to changes in the luminance and relatively less sensitive to changes in the chroma. Because of this, print data expressed in this color space includes a significant amount of redundancy in the Cr and Cb components. As a result, lossy compression can be performed on the lossy page strip element of raster print data with a relatively large compression ratio. This color space dependent compression ratio advantage does not exist for lossless compression. For this reason, lossless page strip elements do not undergo color space conversion from the RGB color space to the YCbCr color space. Although, if this color space conversion were required for other reasons, it could be performed. At a later stage in the print data processing pipeline, both the lossless page strip elements and the lossy page strip elements will undergo color space conversion from the RGB or YCbCr color space to the CMYK color specification. This color space conversion will be discussed in more detail later in this specification.

Forming a lossy and a lossless page strip element from a section of the page corresponding to a single page strip and, in addition, generating a merge plane and a halftone plane, increases the amount of data sent through the print data processing pipeline 15. The merge bit and the two halftone bits associated with each pixel increase the amount of print data. However, because high compression ratios can be achieved for the lossy and lossless page strip elements, and because the merge plane and the halftone plane also undergo lossless compression, the memory space required to contain the print data is only slightly increased in the worst case. But, the resulting improvement in the print quality over pipelines which do not apply different data compression algorithms to lossy and lossless data is substantial. For most print jobs, the print data will be either all lossy or all lossless. For these cases, the only increase in the amount of raster print data sent through the print data processing pipeline 15 from the image processing operation 1 will be the halftone plane if there are different halftone algorithms applied to the pixels of the page strip. If the same halftone algorithms will be applied to all the pixels of the page strip, no halftone plane will be generated in image processing operation 1.

Raster print data may be directly input to the print data processing pipeline. The raster print data may come from a scanner or from the host computer. The device that provides the raster print data also provides a header used by image processing operation 1 to form the page strips. Included in this header is information which the image processing operation 1 can use to separate the raster print data as lossy or lossless for the image processing operation 1.

Before the page strip elements of lossy raster print data undergo lossy compression, the Cr and Cb components of the color space converted page strip elements of raster print data are selectively reduced to decrease the amount of print data the print data processing pipeline 15 must handle, thereby increasing the data throughput and reducing the amount of memory necessary to hold the raster print data. The previously mentioned redundancy in the Cr and Cb components allows this raster print data subsampling to be accomplished while maintaining the visually lossless characteristic of the raster print data. The subsampling operation is performed in the lossy compression operation 5. The lossy compressor operation 5 performs compression on blocks of raster print data formed from sections eight pixels in width along a scan line and eight successive scan lines in height. Through subsampling, the total number of these eight pixel by eight pixel blocks is reduced.

The amount of subsampling which occurs depends upon the amount of data reduction necessary to allow the raster print data to fit into the memory space available. If sufficient memory space is available, subsampling will be performed to reduce the amount of lossy raster print data in the page strip element by one third. If necessary for fitting the lossy raster print data into memory, the subsampling will be performed to reduce the amount of lossy raster print data in the page strip element by one half.

The subsampling to achieve a reduction of one third is achieved as follows. Consider, for example, three groups of lossy raster print data with each group representing four eight by eight blocks of pixels from one color plane. A first group is formed from the luminance component, a second group is formed from the Cr component, and a third group is formed from the Cb component. There are a total of twelve blocks of lossy raster print data. In the second group, for each of the eight scan lines in each of the four blocks, only the lossy raster print data corresponding to alternating pixels along each scan line, beginning with the first pixel of each scan line in each block, is kept. As a result, for each scan line of each of the four blocks, the eight pixel width is reduced to four pixels. In this manner, the four blocks of the Cr component are subsampled down to two blocks. The subsampling of the Cb component from four blocks down to two blocks is accomplished in a similar fashion. After this subsampling, of the original twelve blocks of pixels, eight are remaining, yielding a reduction of one third.

The subsampling to achieve a reduction of one half is done by applying the same subsampling procedure used to achieve a reduction of one third to the remaining two blocks of the Cr component and the two blocks of the Cb component. Applying the same subsampling procedure to the remaining blocks of the Cr and Cb component results in a single block for the Cr component and a single block for the Cb component. After this second pass of subsampling, of the original twelve blocks of pixels, six are remaining, yielding a reduction of one half.

After the subsampling operation is performed, the lossy compression algorithm is applied to the page strip element in the lossy compression operation 5. In the preferred embodiment of the print data processing pipeline 15, the lossy compression method employed is the well known JPEG algorithm. The JPEG lossy compression method was selected because previously developed hardware to implement this method was readily available. However, any lossy compression method, such as vector quantization, could have been used. If there is a lossless page strip element, compression of this page strip element is performed in lossless compression operation 4. In addition, if there is a merge and a halftone plane corresponding to the page strip elements, both of these are compressed in lossless compression operation 4. The preferred embodiment of the print data processing pipeline 15 employs the type of Lempal-Ziv lossless compression/decompression method disclosed in U.S. Pat. No. 5,455,576, the disclosure of which is incorporated by reference herein. However, any lossless compression/decompression method, such as JBIG, run length, or delta row compression may also be used. Further information regarding the techniques used to accomplish lossless and lossy compression can be found in the book "INTRODUCTION TO DATA COMPRESSION", Khalid Sayood, 1996, Morgan Kaufmann Publishers, the disclosure of which is incorporated by reference herein.

The lossy and lossless compressed raster print data generated by, respectively, the lossy compression operation 5 and the lossless compression operation 4, is stored in compressed raster print data memory 6. The space allocated to compressed raster print data memory 6 is of sufficient size to hold all three color planes of the compressed lossy and lossless raster print data for an entire page, the compressed halftone data for an entire page, and the compressed merge data for an entire page. It should be noted that in the preferred embodiment, compressed raster print data memory 6 is not included in the integrated circuit in which the print data processing pipeline 15 is implemented. Furthermore, it should be emphasized that designation of raster print data memory 2 and compressed raster print data memory 6 are in a conceptual sense only for the purposes of explaining the operation of the print data processing pipeline 15. Both raster print data memory 2 and compressed raster print data memory 6 are physically located in system memory and store print data, whether it is compressed raster print data or raster print data on which no compression/decompression operations have been performed. Because the memories are distinguished only by the type of data stored in them at a given time, locations in the system memory may be used to store both types of print data at different times.

The raster print data for each pixel of the lossy or the lossless page strip elements is represented by three bytes, one byte for each color space component of the raster print data. The lossy and lossless page strip elements move through the print data processing pipeline 15 in two parallel channels. Depending upon the location of the print data in the print data processing pipeline 15, the lossy and lossless raster print data streams are either a single byte wide or three bytes wide. Lossy and lossless raster print data enters the color space conversion operations 3, 9, as a three byte wide stream and exits as a single byte wide stream which is packed into a three byte wide stream with each byte of a three byte group representing a dimension of the output color space. Lossy and lossless raster print data enters the color space conversion operation 12 as a three byte wide stream and exits as a single byte wide stream. Each byte of a three byte group entering color space conversion operations 3, 9, 12 represents raster print data corresponding to a single dimension of the input color space. The resulting single byte exiting color space conversion operation 12 represents raster print data corresponding to the single dimension of the output color space which is undergoing printing. Lossy and lossless print data exits the image processing operation 1 as a three byte wide stream. Lossy and lossless print data enters the lossy 5, 8, 11 compression and lossless 4, 7, 10 compression operations as a three byte wide stream and exits as a single byte wide stream which is then buffered to become a three byte wide stream. Lossy and lossless print data enters the lossy 5, 8, 11 decompression and lossless 4, 7, 10 decompression operations as a single byte wide stream and exits as a single byte wide stream. Lossy and lossless raster print data enters and exits both the merge operation 13 and the halftone operation 14 as a single byte wide stream.

The plane of merge data is aligned into bytes. Because only a single bit for each pixel is required for the merge operation, each byte of merge data contains merge information for eight pixels. The plane of halftone data is aligned into eight bit bytes. Because two bits for each pixel are required for the halftone operation, each byte of halftone data contains halftone information for four pixels. Both the halftone plane and the merge plane move through the print data processing pipeline in two parallel byte wide channels.

By forming lossy and lossless page strip elements and then compressing the raster print data in these page strip elements using, respectively, lossy or lossless compression methods, the optimal combination of memory compression and image quality is achieved for the print data. The lossy raster print data can be highly compressed using lossy compression techniques while maintaining its visually lossless characteristics. The lossless raster print data is compressed using lossless compression techniques so that no degradation in image quality is experienced, while achieving high compression ratios. The lossy and lossless compression methods selected are optimized for the lossy raster print data (images) and lossless raster print data (text, line art, and graphics) to yield high compression ratios without degrading image quality. This feature is a significant benefit which results from using lossy and lossless page strip elements in the print data processing pipeline 15. It should be noted that although the preferred embodiment of the print data processing pipeline 15 uses multiple channels to move the page strip elements of lossy and lossless raster print data and the corresponding halftone, and merge data through the print data processing pipeline 15, it would be possible to use a single multiplexed channel to successively transfer page strip elements of print data. Using a single multiplexed channel would sacrifice performance for a reduction in the amount of hardware required.

It is possible to input compressed raster print data into the print data processing pipeline 15. This may happen when compressed raster print data is input into the print data processing pipeline 15 associated with a command in the display list or as raster print data or compressed raster print data may be input into the print data processing pipeline 15 ready for decompression and printing of an entire page. This compressed raster print data may be provided by the host computer or by a scanner through a host computer. Included with this compressed raster print data is a header attached by the host computer containing information used by image processing operation 1.

Consider the case in which it is desired to overlay a lossy image previously input into the print data processing pipeline 15 as display list print data, with a lossy image which is input into the print data processing pipeline 15 as compressed lossy raster print data. For this case, a path is provided in the print data processing pipeline 15 for sending the compressed lossy raster print data from compressed raster print data memory 6 into lossy decompression operation 8, performing a color space conversion in color space conversion operation 9 (for the case in which the compressed lossy raster print data is not expressed in an RGB color space) back to an RGB color space, storing the result in raster print data memory 2, and delivering the decompressed lossy raster print data to the image processing operation 1 for performing the overlay with the previously input lossy image. Image processing operation 1 then performs the partitioning into lossy page strip elements. It should again be emphasized that this path for combining the compressed lossy raster print data with the lossless print data is shown in FIG. 1 in a conceptual sense. The actual routes which print data follows to the hardware functional blocks to accomplish the operations shown in FIG. 1 will be described later in this specification.

As previously mentioned, the print data processing pipeline 15 is able to receive raster or compressed raster print data from a variety of devices, such as a host computer or a scanner, capable of supplying print in that form. Receiving either raster or compressed raster print data eliminates the need for image processing operation 1 to perform the rasterization operation. In addition, if the print data is received as compressed raster print data ready for printing, it is not necessary to perform the lossy 5 and/or lossless 4 compression operations or perform the color space conversion operation 3.

The functional blocks used to accomplish the operations shown in the preferred embodiment of the print data processing pipeline 15 are implemented in a single integrated circuit. The techniques used to implement these functions in a digital integrated circuit are well known in the art of digital integrated circuit design. Implementation of the functions of the print data processing pipeline 15 in dedicated hardware provides superior processing performance for the print data entering the pipeline.

Although it would be possible to perform each of the operations in the print data processing pipeline 15 using a microprocessor, the print data processing performance would be significantly reduced. The microprocessor would be required to alternately handle the lossy and lossless page strip elements to perform the necessary print data compression, color space conversion, and print data decompression operations. In addition, the microprocessor would merge the lossy and lossless pages strip components and perform the halftone operation.

The preferred embodiment of the print data processing pipeline 15 operates with a color laser print engine 16 designed to receive print data expressed in a CMYK color specification. In addition, the print engine 16 operates by sequentially developing the toner for each plane of the CMYK color specification prior to transferring toner to the paper. The four pass development process used by print engine 16 dictates the manner in which raster print data flows through print data processing pipeline 15. Because of this mode of operation of the laser print engine 16, the raster print data for a page is sent in four successive passes, one pass for each dimension of the CMYK color specification, to the print engine 16.

As previously mentioned, the compressed raster print data for the entire page is accumulated in the memory space allocated to the compressed raster print data memory 6 as the lossy and lossless page strip elements are compressed. The lossy compressed raster print data is expressed in a YCbCr color space. The lossless compressed raster print data is expressed in a RGB color space. Conversion of the compressed raster print data to each of the four planes of the CMYK color specification of the laser print engine requires sending of the compressed raster print data for the page through the print data processing pipeline 15 in four successive passes. In each of these four passes, the lossless and lossy compressed raster print data is sent over two, single byte wide channels to the respective lossless 10 and lossy 11 decompression operations for decompressing. Interleaved with the bytes of lossless compressed raster print data are the compressed merge planes and the halftone planes. The merge planes and the halftone planes are interleaved with the lossless raster print data so that they can undergo lossless compression along with the lossless raster print data. After decompression the merge plane and the halftone plane are extracted from the stream of decompressed lossless print data. This will be described in greater detail later in this specification. The lossy compressed print data includes the lossy page strip elements. After decompression of the lossy compressed raster print data, an interpolation operation is performed to expand values for the Cr and Cb components which were eliminated through subsampling prior to compression of the lossy raster print data. The interpolation operation is performed as part of the lossy decompression operation 11.

After the lossy 11 and lossless 10 decompression operation, both the lossless print data and the lossy print data are sent for color space conversion in color space conversion operation 12. Because the print engine 16 uses a four pass development process, the compressed raster print data for all color planes of the page is sent four successive times through the lossy 11 and lossless 10 decompression operations. For each of the four passes of compressed raster print data through the lossless 10 and lossy 11 decompression operations into color space conversion operation 12, color space conversion operation 12 generates one of the four planes of the CMYK color specification. The color space conversion operation 12 is performed using the three eight bit bytes of lossy or lossless raster print data which represent each of the pixels of the page which are to be printed. The raster print data stream output from the color space conversion operation 12 includes two eight bit channels formed from the lossy raster print data and the lossless raster print data. The lossless raster print data input to the color space conversion operation 12 is expressed in the RGB color space. The lossy raster print data input to the color space conversion operation 12 is expressed in the YCrCb color space.

FIG. 1 suggests that lossy 5 and lossless 4 compression operations, lossless 7 and lossy 8 decompression operations, and lossless 10 and lossy 11 decompression operations are accomplished in separate hardware units. However, in the preferred embodiment of the print data processing pipeline 15, there is a single hardware unit which performs lossy compression and decompression and there is a single hardware unit which performs lossless compression and decompression. These units perform all the compression/decompression operations for the print data processing pipeline 15. Although for the purposes of describing the print data processing pipeline 15, FIG. 1 shows color space conversion operations 3, 9, and 12 as separate hardware units, in the preferred embodiment, a single color space converter is used to perform all of the necessary color space conversions. In the preferred embodiment of the print data processing pipeline 15, the color space converter is that disclosed in the co-pending application entitled "APPARATUS FOR GENERATING INTERPOLATOR INPUT DATA", having U.S. Pat. No. 5,717,507 and the co-pending application entitled "APPARATUS FOR ROUTING INTERPOLATOR INPUT DATA", having U.S. Pat. No. 5,666,437, each of which are assigned to the same assignee as this patent application, and each of which are incorporated herein by reference. One of ordinary skill in the art will recognize after understanding this specification that any color space converter which can perform a conversion between the color spaces selected to express the lossy and lossless print data and the color specification used by the laser print engine is suitable for use in a multi-path print data processing pipeline.

Merge operation 13 receives as inputs the lossless raster print data stream, the lossy raster print data stream, the halftone data stream, and the merge data stream. Each of these print data streams is formed from a stream of bytes. The print data representing a single color plane of the print engine color specification for each of the pixels of the entire page is contained in the lossless and lossy raster print data streams. The function of the merge operation 13 is to combine, pixel by pixel, these two raster print data streams so that the original image, previously split into lossless and lossy page strip elements, is reconstructed for the color plane being processed. The bits of the merge data associated with each pixel are used by merge operation 13 to determine if the raster print data for the pixel currently being processed is selected from the lossless raster print data stream or from the lossy raster print data stream. Subsequent passes of lossy and lossless raster print data through the merge operation 13 reconstructs the original image for the remaining color planes of the print engine color specification. Each of the pixels corresponds to a location on what will be the printed page. The reconstruction process can be regarded as a spatial synchronization of the lossless and lossy raster print data streams to generate the original image. Furthermore, to achieve the spatial synchronization, the lossless and lossy raster print data streams and the stream of merge data must be synchronized in time.

The disclosed print data processing pipeline 15 takes advantage of the plane by plane developing characteristic of the print engine 16 to reduce the total memory required to accomplish the printing operation. By placing the merge operation 13 in the print data processing pipeline 15 subsequent to the color space conversion operation 12, it is only necessary that the merge operation 13 use a minimally sized line buffer for the storage of raster print data for a single color plane of the print engine 16 CMYK color specification. Had the merge operation 13 been located in the print data processing pipeline 15 prior to the color space conversion operation 12, it would be necessary that the merge operation 13 use a line buffer of size sufficient to store the raster print data for each of the three dimensions of the RGB and YCrCb color spaces.

It should be recognized that a print data processing pipeline architecture which uses separate paths for the lossless and the lossy print data is compatible with a print engine which operates by receiving the raster print data for all color planes of the print engine color specification in a single pass, instead of multiple passes. For this case it would be necessary that the color space conversion operation 12 perform a color space conversion on the raster print data representing each pixel to generate each of the corresponding values for the C, M, Y, and K dimensions simultaneously. This would require that the color space conversion operation 12 have the capability to simultaneously perform the interpolations necessary to generate each of the C, M, Y, and K dimensions. In addition, the merge operation 13 would have to use sufficient memory space to contain a page of raster print data for each of the C, M, Y, and K dimensions.

In the preferred embodiment of the print data processing pipeline 15, the raster print data combined in merge operation 13 is subjected to a halftoning operation 14. The halftone operation 14 is located so that halftoning is the last operation performed on the raster print data prior to the delivery of the print data to the print engine 16. The halftone operation 14 performs the halftoning process plane by plane on the merged raster print data as directed by the halftone print data associated with each pixel. Locating the halftone operation 14 after the merge operation 13 allows the halftoning operation 14 to be performed sequentially on each color plane of the color space used by the print engine 16, thereby requiring less memory for storing the raster print data. In addition, had the halftoning operation 14 been performed prior to the merge operation, the complexity of the halftone operation 14 would have been significantly increased because of the necessity of separately performing the halftoning operation 14 on the stream of lossless raster print data and on the stream of lossy raster print data. Furthermore, placement of the halftone operation 14 last in the print data processing pipeline 15 results in the optimum print quality. Locating the halftone operation 14 prior to the compression of the lossy raster print data would have resulted in a loss of some of the enhancements achieved by the halftoning process and the compression level achieved on the halftoned raster print data would be reduced. Additionally, the highest level of print quality is achieved by performing the halftoning operation 14 on raster print data represented in the color specification of the print engine. Therefore, in the preferred embodiment of the print data processing pipeline 15, the halftone operation 14 is located after the color space conversion operation 12.

The assignment of the halftone bits to each pixel of raster print data is performed in image processing operation 1 to build the halftone plane. As previously mentioned, the print data entering the print data processing pipeline may be text, graphics, or image print data in the form of raster print data, printer control language print data, or graphics language print data. Firmware operating in the image processing block operation 1 generates the halftone plane for the corresponding lossy and lossless page strip elements according to the type of halftone algorithm which will be applied. For example, the halftone bits for the text print data may be assigned "11", halftone bits for graphics print data may be assigned "10", halftone bits for image print data may be assigned "01", and the halftone bits indicating that no halftone operation is to be applied to the print data corresponding to the pixel may be assigned "00". The assignment of the halftone bits allows the application of a halftone operation optimized for the type of print data associated with the halftone bits. For example, the halftone bits may specify halftone algorithms having line screens with different numbers of lines per inch. Halftone operations are well known in the art of printing. Further information regarding halftoning can be found in Ulichney, R, Digital Halftoning, ISBN 0-262-21009-6 (fourth printing 1993) incorporated herein by reference.

Merge operation 13 receives as inputs the lossless raster print data stream, the lossy raster print data stream, the halftone print data stream, and the merge print data stream. Each of these print data streams is formed from eight bit bytes. The print data representing a single color plane of the print engine color specification for each of the pixels of the entire page is contained in the lossless and lossy raster print data streams. The function of the merge operation 13 is to combine, pixel by pixel, these two raster print data streams so that the original image, previously split into lossless and lossy page strip elements, is reconstructed for the color plane being processed. Subsequent passes of lossy and lossless raster print data through the merge operation 13 reconstructs the original image for the remaining planes of the print engine color specification. Each of the pixels corresponds to a location on what will be the printed page. The reconstruction process can be regarded as a spatial synchronization of the lossless and lossy raster print data streams to generate the original image. Furthermore, to achieve the spatial synchronization, the lossless and lossy raster print data streams and the print data stream of halftone bits must be synchronized in time.

Configuration of the print data processing pipeline 15 is performed before and during the passage of print data through the print data processing pipeline 15. Some parameters of the pipeline can be configured for each page, some for each color plane, and some for each page strip. The number of lines per page and the number of pixels per line are configurable on a page basis. In addition, the number of color planes processed by the print data processing pipeline 15 (i.e. will the image be printed in monochrome or full color) is configurable on a page basis.

Processing the raster print data for each color plane requires configuration of the color space conversion operations 3, 9, 12. Prior to the performance of color space conversion operations 3, 9, 12, the color space conversion table required for conversion to the intended color plane of the output color space is loaded. Furthermore, processing of each color plane through halftone operation 14 involves configuration of halftone operation 14 so that the correct halftone table is used for halftoning the color plane. For example, when processing successive color planes of an image, each halftone table may correspond to a halftoning algorithm using the selected line screen at a different relative angle. As is well known in the art of halftoning, use of a selected line screen at different relative angles for successively printed color planes reduces interaction between the color planes which produces print artifacts.

The print data processing pipeline 15 also has parameters configurable on a page strip basis. The image processing operation 1 can configure the print data processing pipeline 15 to perform the various available pipeline processing operations for each page strip. For example, the image processing operation 1 may configure, on a page strip basis, the print data processing operation 15 to perform or bypass the compression operations 4, 5, the decompression operations 7, 8, 10, 11, the color space conversion operations 3, 9, 12, or the halftone operation 14. In addition, the number of bits per pixel for the lossless page strip elements may be specified as 1, 2, 4, or 8 on a page strip basis. For the preferred embodiment of the print data processing pipeline 15, the compression algorithm employed in lossy compression operation 5 requires 8 bits per pixel for the lossy page strip element. Furthermore, image processing operation 1 may specify that the lossy or lossless component of a page strip is formed from null data and that each bit of the corresponding merge plane is of the same value.

Figure 2:
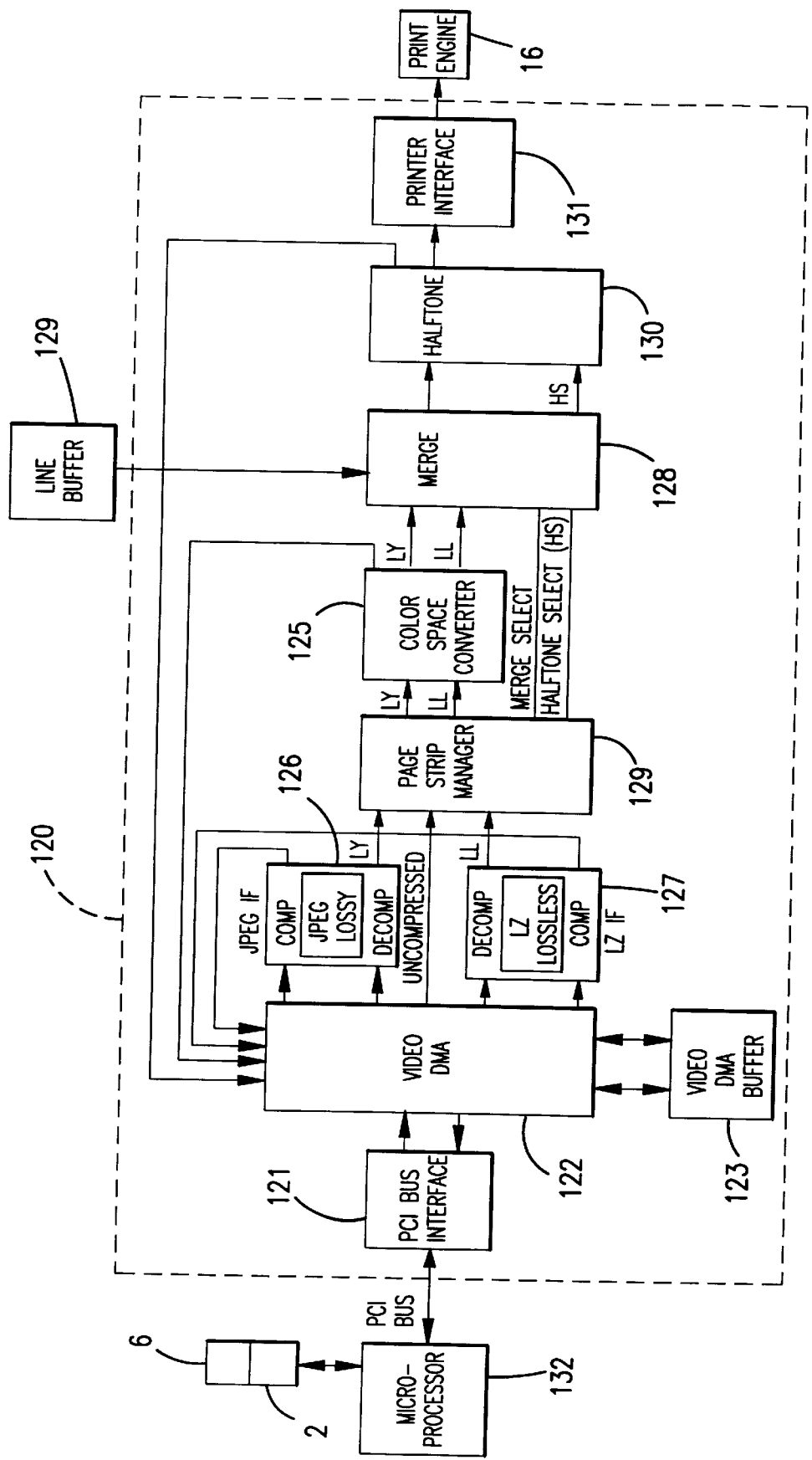
FIG. 2 is a simplified hardware block diagram of the preferred embodiment of the print data processing pipeline.

Shown in FIG. 2 is a simplified hardware block diagram of the preferred embodiment of the print data processing pipeline 15. It should be noted that the paths connecting the functional blocks shown in FIG. 2 represent data paths. Not shown in FIG. 2 are the various control lines used to control the flow of data between the functional blocks. In the preferred embodiment, the compression/decompression operations 4, 5, 7, 8, 10, 11, the color space conversion operations 3, 9, 12, the merge operation 13, and the halftone operation 14 are implemented in an ASIC 120. The preferred embodiment of print data processing pipeline 15 is configured for connection of the ASIC 120 to a PCI bus. However, one of ordinary skill in the art will recognize that print data processing pipeline 15 may be configured for connection to other types of busses, such as a VESA bus. The PCI bus architecture is well known in the art of digital system design and will not be discussed in detail. Image processing operation 1 is performed by a processor, such as microprocessor 132, which communicates with the print data processing pipeline 15 over the PCI bus. Print data is retrieved from and loaded into raster print data memory 2 and compressed raster print data memory 6 as it is transferred to and from ASIC 120.

ASIC 120 interfaces to the PCI bus through the PCI bus interface 121. PCI bus interface 121 includes registers necessary for configuration of the PCI bus interface 121 and registers used for buffering print data as it flows between the PCI bus and ASIC 120. A direct memory access controller, such as video DMA 122, controls the flow of print data into and out of the parts of ASIC 120 which perform the various functions of print data processing pipeline 15. Video DMA buffer 123 temporarily stores print data as it passes through video DMA 122 to match the print data rates between the PCI bus and the various functional blocks of ASIC 120 as print data moves into and out of ASIC 120. Use of the video DMA buffer compensates for the mismatch in the rate of data flow between the PCI bus interface 121 and the functional blocks in the remainder of ASIC 120.

Several important advantages result from the implementation of the print data processing pipeline 15 in ASIC 120. A first advantage is the efficient way in which the processing operations for the print data processing pipeline 15 are accomplished internal to ASIC 120. By locating all of the operations on ASIC 120, print data can be transferred between successive operations without incurring the processing overhead which would result if transfers of print data took place over the PCI bus between separate integrated circuits dedicated to performing single print data pipeline processing operations. A second advantage is the ability to configure ASIC 120 to selectively bypass print data around functional blocks within the ASIC 120. A third advantage is the ability to selectively feedback the output of a functional block to the video DMA 122 for routing to another functional block or for storage in memory. These capabilities create an extremely flexible and efficient print data processing pipeline which can be configured to optimize the print data processing operations depending upon the type of print data. Because ASIC 120 can be configured to perform a specific subset of the possible print data processing operations, the operations applied to the print data can be adapted to the characteristics of the print data in a wide variety of ways. This allows the printing system to configure the pipeline for optimal processing of all possible types of print data. The feedback capability allows the print data processing operations to be performed in an order best suited to prepare the print data for printing a page. After completion of an operation in the print data processing pipeline 15, the results can be steered by video DMA 122 to the next operation.

Depending upon the type of operation the print data processing pipeline 15 is to perform upon the print data loaded from the PCI bus, the video DMA 122 will be configured to deliver the print data to the appropriate functional block in ASIC 120. If color space conversion is required, print data is sent by video DMA 122 to page strip manager 124. Page strip manager 124 sends the print data from the video DMA 122 into the appropriate lossy or lossless input of color space converter 125. In addition, page strip manager 124 extracts the merge data and the halftone data interleaved with the lossless raster print data sends each of these over separate byte wide channels to merge unit 128. If compression or decompression of print data is required, print data is directed by video DMA 122 to the appropriate compression or decompression input on lossy compressor/decompressor 126 or lossless compressor/decompressor 127. Merge unit 128 performs the merge operation 13 on the lossy and lossless raster print data streams emerging from color space converter 125. Line buffer 129 includes SRAM for buffering of the lossy and lossless raster print data and the merge and halftone data used in the merge operation 13. Halftone unit 130 performs the halftone operation 14 on the merged raster print data stream, corresponding to each of the pixels, according to the bits specified in the halftone plane. Although not explicitly shown in FIG. 2, both the color space converter 125 and the halftone unit 130 can be configured to bypass print data around these functional blocks if the operations to be performed upon the print data do not include color space conversion and/or halftoning.

As operations are completed upon print data flowing through the print data processing pipeline 15 of FIG. 1, the print data may be transferred from ASIC 120 into memory and at a later time back into ASIC 120 for further processing. For example, after the lossy 5 and lossless 4 compression operations are performed, respectively, in the lossy 126 and lossless 127 compressors/decompressors, the resulting compressed raster print data can be routed to video DMA 122, through the PCI bus interface 121, and then over the PCI bus to the compressed raster print data memory 6. When the compressed raster print data is to be decompressed, it is transferred over the PCI bus to ASIC 120 from compressed raster print data memory 6, through PCI Bus Interface 121 and then it is directed by video DMA 122 into the decompress input of either or both lossy 126 and lossless 127 compressors/decompressors. After the color space conversion operation 3 is performed upon the lossy and/or lossless raster print data, the resulting raster print data could be returned to the lossy 126 compressor/decompressor and/or lossless 127 compressor/decompressor through video DMA 122, or, it could be returned to raster print data memory 2 through video DMA 122, and PCI bus interface 121, or, it could be sent to merge unit 128 for performing the merge operation 13. Included in color space converter 125 is a selector which directs the lossy or lossless color space converted raster print data to the lossy or lossless outputs of color space converter 125 which are coupled to the lossy and lossless print data inputs on merge unit 130.

The page strip manager 124 manages the raster print data so that the color space conversion operations 3, 9, 12, the merge operation 13, and the halftone operation 14 of print data processing pipeline 15 receive a stream of raster print data having a uniform format. For example, in situations in which only a single lossy or lossless page strip element is generated in image processing operation 1, page strip manager 124 will generate a corresponding lossy or lossless page strip element, as is appropriate, of blank print data so that corresponding lossy and lossless page strip elements will be sent on the lossy and lossless paths to color space converter 125. In addition, for the case in which only a single lossy or lossless page strip element is generated by image processing operation 1, the page strip manager 124 generates the corresponding merge plane which will be formed of the same bit corresponding to each pixel of the page strip element. Furthermore, for the case in which the same halftone processes are applied to each pixel of the page strip, the page strip manager 124 will generate the halftone plane corresponding to the page strip The page strip manager 124 will send the merge data and the halftone data over separate byte wide paths to the merge unit 128.

The page strip manager 124 receives the decompressed lossy and lossless raster print data over separate byte wide channels. When compressed lossy raster print data is decompressed by lossy compressor/decompressor 126, the resulting 8 pixel by 8 pixel blocks for each dimension of the color space will be stored in three 64 byte output buffers included in lossy compressor/decompressor 126. Page strip manager 124 receives a byte wide stream of the lossy raster print data sent from the three output buffers. The bytes of the decompressed lossy raster print data corresponding to each pixel are sent from the output buffers of lossy compressor/decompressor 126 as three successive bytes with one byte corresponding to each dimension of the color space. For example, the first of the three successive bytes might correspond to the "Y" component, the second to the "Cb" component, and the third to the "Cr" component. The page strip manager 124 assembles the three corresponding bytes of lossy raster print data for a pixel and sends them as a 24 bit wide stream of lossy raster print data to color space converter 125.

The page strip manager 124 receives the decompressed lossless raster print data as a byte wide stream of three successive bytes for each lossless pixel. For example, the first of the three successive bytes might correspond to the "R" component, the second to the "G" component, and the third to the "B" component. Interleaved with the lossless raster print data sent from lossless compressor/decompressor 127 are the merge data and the halftone data. The interleaving is done so that bytes of lossless raster print data corresponding to a single line on the printed page are sent, followed by the necessary number of bytes of merge data and halftone data to correspond to the line of lossless raster print data. Page strip manager 124 extracts the merge data and the halftone data and sends them over separate channels to merge unit 128. Page strip manager 124 assembles the three corresponding bytes of lossless raster print data for a pixel and sends them as a 24 bit wide stream of lossless raster print data to color space converter 125.

In some cases Video DMA 122 bypasses the compression step and sends raster print data directly to page strip manager 124. This may be done when a page of raster print data is sent to the print engine 16 without compression and storage in compressed raster print data memory 6. In this case raster print data flows through the print data processing pipeline 15 in a linear fashion without taking any of the various feedback paths. It is also possible that raster print data could be sent directly from Video DMA 122 to page strip manager 124, through the subsequent print data processing pipeline 15 processing operations, such as color space conversion and halftoning, return on a feedback path through video DMA 122 for sending to the appropriate compressor, and then return the compressed raster print data to Video DMA 122 for storage in memory.

The lossless raster print data can be specified by one bit, two bits, four bits, or eight bits per dimension of the color space for each pixel. Prior to sending the lossless raster print data to color space converter 125, page strip manager 124 converts one bit, two bit, and four bit representations to a full eight bit per dimension of each pixel representation. The parameters of the raster print data can change between page strip elements as well as having different types of print data processing pipeline operations applied to each of the page strip elements. Page strip manager 124 performs the operations necessary so that a seamless (seamless in the sense that raster print data format differences between page strip elements are eliminated and in the sense that there is little variation in the flow rate of raster print data through the print data processing pipeline 15) stream of uniform format raster print data is delivered to downstream print data processing pipeline operations.

Providing a number of specific examples of the type of print data processing operations likely to be performed will better illustrate the considerable versatility of the print data processing pipeline 15 implemented in ASIC 120. Consider a first case in which a page is to be printed using raster print data expressed in the CYMK engine color specification on which no compression/decompression operations have been performed and for which halftoning will be applied to the raster print data. The lossy and lossless raster print data is transferred, a color plane at a time, from system memory through the PCI bus interface 121. Video DMA 122 sends the lossy and lossless raster print data through page strip manager 124 to the color space converter 125 which has been configured to bypass the print data. The merge unit 128 performs the merge operation 13 on the lossy and lossless raster print data and sends the merged print data to the halftoning unit 130 for the halftone operation 14. The halftoned raster print data is sent through the print engine interface 131 to the print engine 16. In this first case, the print data processing pipeline 15 was configured to perform only the merge operation 13 and the halftone operation 14.

In a second case, the print data processing pipeline 15 is configured to perform a decompression operation 10, 11 on the lossy and lossless compressed raster print data, perform the color space conversion operation 12, the merge operation 13 and also perform the halftone operation 14. The lossy and lossless compressed raster print data is transferred from system memory through the PCI bus interface 121. Video DMA 122 directs the lossy and lossless compressed raster print data into the lossy 126 and lossless compressors/ decompressors 127 for decompression. The decompressed lossless and lossy raster print data is sent to the color space converter 125 for conversion to one of the color planes for each of the four passes of print engine 16. The lossy and lossless color space converted raster print data output from color space converter 125 is sent to merge unit 128 for performing the merge operation 13. The halftone operation 14 is performed on the merged print data output from merge unit 128. The results of the halftone operation are sent back to video DMA 122 for sending through PCI bus interface 121 to system memory. This sequence occurs four times in succession to generate the print data for each color plane of print engine 16. In this second case, the print data processing pipeline 15 was configured to return the processed print data to system memory for printing at a later time. Although the video DMA 122 was required to handle all the print data twice, once during loading and once during storing, multiple operations were performed on the print data in ASIC 120 without the use of the PCI bus or intervention by the microprocessor 132.

In a third case, the print data processing pipeline 15 is configured to perform a color space conversion operation, a halftone operation, and then a lossless compression operation. Lossless raster print data is transferred from system memory through the PCI bus interface 121. Video DMA 122 directs the lossless raster print data to color space converter 125 through page strip manager 130 to undergo conversion to a plane of the color space of print engine 16. Page strip manager 134 generates the corresponding blank lossy raster print data and merge print data. The blank lossy raster print data is bypassed around color space converter 125. Merge unit 130 performs a merge operation on the lossless and lossy raster print data using the merge print data generated by the page strip manager 124. Halftone unit 130 performs a halftone operation 14 on the merged raster print data. The raster print data output from the halftone unit 130 is sent to video DMA 122. Video DMA 122 then directs the raster print data to the lossless compressor/decompressor 127 for lossless compression. The compressed raster print data is returned to video DMA which in turns sends the compressed raster print data through PCI bus interface 121 to system memory for storage. This sequence occurs four times in succession to generate the print data for each color plane of print engine 16. In contrast to the second case, the order in which the print data processing operations have been performed has been changed. This illustrates the ability of the print data processing pipeline 15 to be configured to optimize processing of the print data.

Some prior art print data processing pipelines have been implemented using a general purpose microprocessor to accomplish the various color space conversion, compression/decompression, merge, and halftone operations. The speed with which a microprocessor can execute firmware to accomplish these operations is less than that which can be achieved using dedicated hardware. Furthermore, using a general purpose microprocessor to accomplish these operations results in significant data transfer overhead because of the intermediate print data transfers between the microprocessor and memory over the system bus. The large number of transfers over the system bus substantially degrades the processing capability of a print data processing pipeline implemented using a general purpose microprocessor.

Print data processing pipelines have been implemented using dedicated integrated circuits to accomplish specific functions of the print data processing pipeline. Operations such as color space conversion and compression/ decompression have been implemented in individual integrated circuits. However, a general purpose microprocessor is still required for moving print data between the various integrated circuits and memory as the operations of the print data processing pipeline are performed. Although this provides some improvement in the processing time because of the use of dedicated hardware, the data transfer overhead is still a performance limiting factor. The implementation of the print data processing pipeline 15 in ASIC 120 avoids this data transfer overhead by performing multiple pipeline operations within ASIC 120.

The preferred embodiment of merge unit 130 selects from the lossy and lossless raster print data streams to form a single data stream using the merge bits to reconstruct the original image. However, it should be recognized that the techniques used in merge unit 130 are useful to combine, in a similar fashion, more than two data streams using multiple merge bits for each unit of data merged. Additionally, the data streams merged may include types of data other than raster print data or partitions of raster print data in ways other than into lossy and lossless raster print data streams. For example, the raster print data stream may be partitioned into multiple streams depending upon the application of a halftone operation to the pixels of raster print data. Those pixels of raster print data undergoing a halftone operation would be compressed using a compression operation optimized for halftoned raster print data. Those pixels of raster print data which have not been halftoned would undergo a different compression operation. Another possible partition of the raster print data stream would be based upon the number of bits used to represent each color space dimension of the pixel. For example, areas of a page which contain black and white information could be represented by fewer bits per pixel than areas of pages which contain color images. In the most extreme case, some areas of the page might have a full color 24 bit per pixel representation and other areas of the page might have a binary black and white 1 bit per pixel representation. Separately processing a 24 bit per pixel stream of raster print data and a 1 bit per pixel stream of raster print data allows optimization of the compression and halftoning operations for each of the streams. A further possible partition of the raster print data stream would be based upon the resolution used to represent the page. Areas of an image which did not contain highly detailed features could be printed with a lower resolution such as 600 dpi. Areas of an image which did contain highly detailed features could be printed with higher resolution such as 1200 dpi. This case may occur when there is a constant gray scale region with a sharp boundary. Separately processing a higher resolution raster print data stream and a lower resolution raster print data stream would allow optimization of halftone and compression operations for each of the raster print data streams.

It should be noted that although the preferred embodiment of the print data processing pipeline 15 employs a merge unit 130 which performs the merge operation 13 on digital data, it would be possible to implement a merge operation on the surface of the photoconductor drum in print engine 16 through developing, on successive passes, the lossy and lossless raster print data onto the surface of the photoconductor drum. This merge operation would effectively be an OR operation between the lossy and the lossless raster print data as it is developed on the photoconductor drum. Furthermore, it would also be possible to implement merge operation 13 on digital data so that an OR operation between the lossy and lossless raster print data is performed, instead of employing a merge plane to specify from which these streams the raster print data is to be selected.

Figure 3:
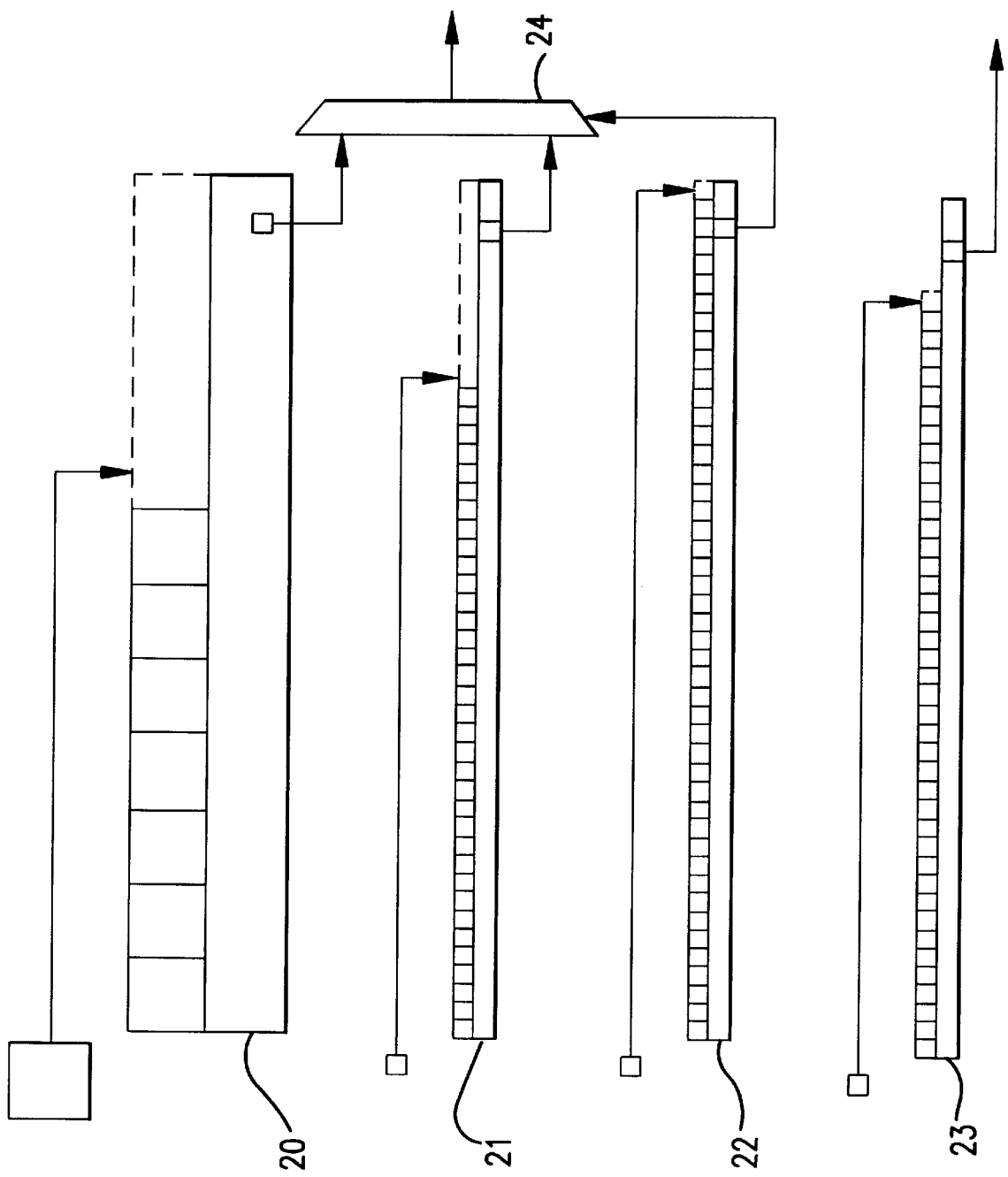
FIG. 3 is a conceptual illustration of the merge operation.

Shown in FIG. 3 is a diagrammatic representation of the operation performed by merge unit 128. Each of the sections 20–23 are part of SRAM line buffer 129 and each section corresponds to two buffers which hold one of the four types of print data streams entering the merge unit 128. Buffering is required so that sufficient print data is available, as necessary, from each of the print data streams to perform the merge operation 13 without decreasing the raster print data throughput of merge unit 128. As the merge unit 128 processes each merge bit, bytes of raster print data must be available from both the lossless or lossy print data stream to assign to the pixel being processed. In addition, the halftone bits must be available to maintain the spatial relationship with the pixel being processed. For the lossless print data stream, a sufficient number of bytes are stored in lossless line buffer 21 to cover two entire scan lines in the print engine if the pixels were placed continuously on the printed page. By storing two lines of lossless raster print data in the two buffers which form lossless line buffer 21, the lossless raster print data can move through lossless line buffer 21 in a "ping-pong" fashion to maintain high throughput.

The data compression algorithm operating upon the lossy raster print data in the preferred embodiment of the print data processing pipeline 15 operates by partitioning the pixels of the lossy page strip element to form cells used in the compression operation. The cell size selected in the preferred embodiment of the print data processing pipeline has a width of eight pixels and a height of eight pixels. When decompression is performed upon the compressed lossy rasterized print data, enough bytes of raster print data to correspond to a block eight pixels in width and eight pixels in height are produced as the output of the lossy decompression operation 11. Because decompression of the compressed lossy raster print data is done block by block and to ensure sufficient buffering of the lossy raster print data output from the color space converter 125, lossy line buffer 20 has the capacity to store two rows of blocks. Two rows of blocks equates to a sufficient number of pixels to entirely cover sixteen print engine scan lines. By storing two rows of blocks of lossy raster print data in the two buffers which form lossy line buffer 20, the lossy raster print data can move through lossy line buffer 20 in a "ping-pong" fashion to maintain high throughput. Merge line buffer 22 and halftone line buffer 23 contain, respectively, sufficient merge bits and halftone bits to process two scan lines of pixels. Therefore, the storage capacity of merge line buffer 22 would be one eighth that of lossless line buffer 21 and the storage capacity of halftone line buffer 23 would be one fourth that of the lossless line buffer 21.

The inputs of print data multiplexor 24 are connected to the outputs of lossy line buffer 20 and lossless line buffer 21. The output of merge line buffer 22 controls the selection of the input raster print data stream for the output of print data multiplexor 24. Based upon the state of the merge bit for the pixel undergoing processing, print data multiplexor 24 selects the raster print data for the pixel being processed from either the lossy raster print data stream or the lossless raster print data stream. The merged raster print data stream from the output of print data multiplexor 24 is a combination of the two input raster print data streams so that the spatial synchronization between the pixels in the original image is maintained in the reconstructed image. The halftone bits previously assigned to corresponding pixels of both the lossless and lossy raster print data streams maintain the pixel by pixel spatial synchronization with the raster print data present when the halftone bits entered the merge unit 128.

Figure 4:
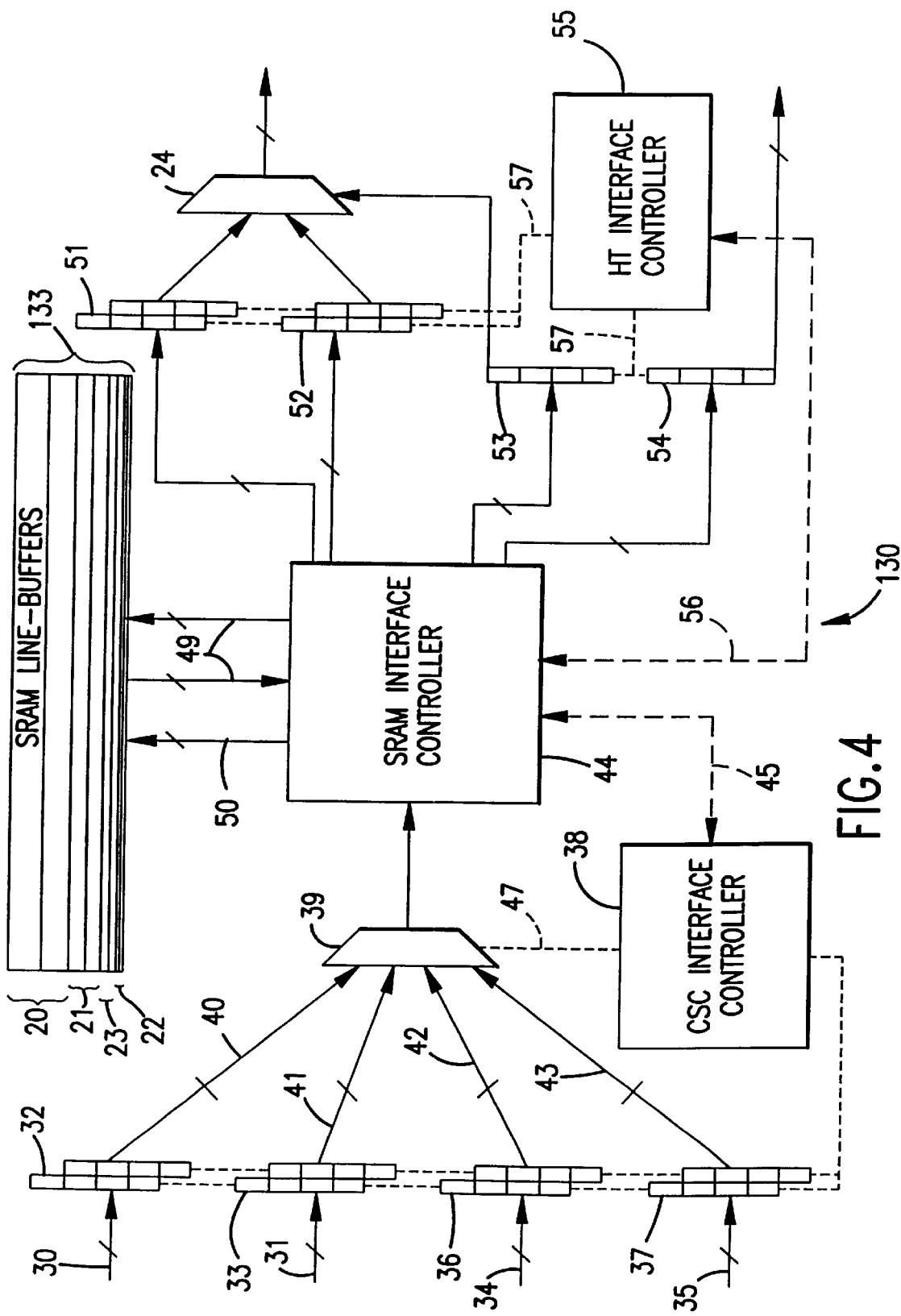
FIG. 4 is a high level simplified block diagram of the merge unit.

Shown in FIG. 4 is a high level block diagram of merge unit 128. The lossy raster print data stream 30 and the lossless raster print data stream 31, each consisting of a stream of eight bit bytes, are stored, respectively, in lossy input buffer 32 and lossless input buffer 33. The stream of merge bits 34 and halftone bits 35, each formed into a stream consisting of eight bit bytes, are stored respectively in merge input buffer 36 and halftone input buffer 37. The input buffers 32, 33, 36, 37 are designed so that each of these print data streams is converted from eight bits wide to thirty two bits wide when the print data streams are sent from the input buffers 32, 33, 36, 37.

Color space converter interface controller 38 includes the input buffer control capability which manages the transfer of the four print data streams through input buffers 32, 33, 36, 37. This control capability sends and receives handshaking signals to and from color space converter 125. These handshaking signals control the flow of print data from the color space converter 125 to the input buffers 32, 33, 36, 37. From these handshaking signals, color space converter interface controller 38 generates the enable signals which allow input buffers 32, 33, 36, 37 to load the appropriate type of print data (lossy, lossless, halftone, or merge) into the corresponding one of the input buffers 32, 33, 36, 37. The handshaking signals received from the color space converter 125 include signals which indicate when lossy and lossless raster print data is available for transfer to the lossy 32 and lossless 33 input buffers. The color space converter interface controller 38 also receives handshaking signals which indicate when the merge and halftone print data is available for transfer to the merge 36 and halftone 37 input buffers. The handshaking signals sent from the color space converter interface controller 38 to the color space converter 125 and the page strip manager 134 also include signals which indicate when each of the input buffers 32, 33, 36, 37 are ready to receive input print data. The thirty two bit wide data streams 40, 41, 42, 43 output from each of the input buffers 32, 33, 36, 37 are sent to the input buffer multiplexor 39. Color space converter interface controller 38 controls the flow of the print data streams from the input buffers 32, 33, 36, 37 through the input buffer multiplexor 39. Control signals 47 generated by the color space converter interface controller 38 select one of the thirty two bit wide data streams 40, 41, 42, 43 for transfer to the SRAM interface controller 44. A state machine (not shown separately) included in the color space converter interface controller 38 generates the control signals 47 which determine which of the print data streams from input buffers 32, 33, 36, 37 will be selected by input buffer multiplexor 39 for transfer to SRAM interface controller 44.

SRAM interface controller 44 and color space converter interface controller 38 each generate the necessary handshake signals 45 to transfer print data through the input buffer multiplexor 39 to the SRAM interface controller 44. SRAM interface controller 44 generates a handshake signal which indicates to the color space converter interface controller 38 that the SRAM interface controller 44 is ready to receive print data. The color space converter interface controller 38 provides control signals to identify the type of print data (lossy, lossless, halftone, or merge) sent from input buffer multiplexor 39. Print data received by the SRAM interface controller 44 is stored in SRAM line buffer 129. SRAM line buffer 129 is partitioned into sections corresponding to each of the print data types (lossy, lossless, halftone, and merge). The line buffers 20–23 in SRAM line buffer 129 correspond to those depicted in FIG. 3. Storage of the print data in the SRAM line buffer 129 ensures that sufficient print data is available to perform the merge operation uninterrupted. The print data received by the SRAM interface controller 44 is stored in the appropriate section of SRAM line buffer 129 as determined by the control signals 45 from the color space converter interface controller 38. The print data stored in SRAM line buffer 129 is loaded into SRAM interface controller 44 so that the print data is available for performing the merge operation 13. Print data is stored into and loaded from SRAM line buffer 129 over a single bi-directional thirty two bit wide bus 49. Although this bus 49 is depicted in FIG. 3 as two uni-directional buses, the preferred embodiment of the merge unit 128 uses a single bi-directional bus. SRAM interface controller 44 generates the addresses to access storage locations in the SRAM line buffer 129 over address bus 50.

Print data loaded from SRAM line buffer 129 into SRAM interface controller 44 is transferred to output buffers 51, 52, 53, 54 in preparation for performing the merge operation. Output buffers 51, 52, 53, 54 include the lossy output buffer 51, the lossless output buffer 52, the merge output buffer 53, and the halftone output buffer 54. The halftone output buffer 54 and the merge output buffer 53 are each formed from shift registers. The use of shift registers allows thirty two bit words of the halftone print data and the merge print data to be partitioned into the pairs of bits (halftone print data) or individual bits (merge print data) which will be matched with raster print data corresponding to the commonly associated pixel. Transfer of the print data from the SRAM interface controller to the output buffers 51, 52, 53, 54 is managed by control signals 56 between the halftone interface controller 55 and SRAM interface controller 44. The control signals 56 include signals which indicate when each of the output buffers 51, 52, 53, 54 is ready to receive the corresponding type of print data (lossy, lossless, halftone, merge) and include signals which indicate when SRAM interface controller 44 has print data available for transfer to output buffers 51, 52, 53, 54.

Halftone interface controller 55 generates control signals 57 which control the transfer of print data through output buffers 51, 52, 53, 54. The input print data stream into each of output buffers 51, 52, 53, 54 is thirty two bits wide. The lossy and lossless raster print data streams output from lossy raster print data output buffer 51 and lossless raster print data output buffer 52 are each eight bits wide. The control signals 57 include the enable signals which allow the appropriate print data type to be loaded into the corresponding output buffers 51, 52, 53, 54. Included in each of the lossy 51 and lossless 52 raster print data output buffers is a multiplexor (not shown in FIG. 4) which selects one of the four eight bit bytes included in the thirty two bit wide lossy and lossless raster print data streams for transfer to print data multiplexor 24. The control signals 57 include the signals necessary to control the multiplexors which are part of the lossy output buffer 51 and lossless output buffer 52. The control signals 57 generated by halftone interface controller 55 include the signals necessary to load the thirty two bit wide halftone and merge data streams into the corresponding halftone data output buffer 54 and merge data output buffer 53. As previously mentioned, the halftone data output buffer 54 and the merge data output buffer 53 each include shift registers. In addition, the halftone data output buffer 54 and the merge data output buffer 53 each include a multiplexor (not shown in FIG. 4) which selects from either the shift right output or the shift left output as determined by a signal included in control signals 57. This signal also controls the direction in which the shift register moves the merge data and the halftone data. It is necessary to control the direction in the shift register moves the merge data and halftone data for printing in duplex mode. In duplex mode printing the order in which the raster print data is delivered to the print engine 16, relative to the top and bottom of the page, is reversed between printing the front side and the back side of the page.

Print data multiplexor 24 receives as inputs the byte wide lossy and lossless raster print data streams. The single bit wide merge data stream output from merge output buffer 53 controls the selection of one of the input raster print data streams for output from merge unit 128. By maintaining the relative order of the merge bits in the merge data stream and the relative order of the lossy and lossless raster print data in their respective raster print data streams as they were moved through the various buffers in the merge unit 128, the merge operation 13 performed by print data multiplexor 24 correctly reconstructs, on a pixel by pixel basis, the original page. One of ordinary skill in the art of digital design would, after understanding this specification, possess the knowledge to design the logic circuits necessary to perform the functions of print data multiplexor 24.

SRAM line buffer 129 allows establishment of temporal and spatial synchronization between the lossy and lossless raster print data, the merge data, and the halftone data. Because the decompressed lossy raster print data is decompressed in 8 pixel wide and 8 pixel high blocks, the decompressed lossy raster print data is delivered to the merge unit 128 and stored in SRAM line buffer 129 out of synchronization with the other print data. The manner in which the print data is removed from SRAM line buffer 129 establishes the temporal and spatial synchronization. It should be noted that merge unit implementations which do not require the use of SRAM line buffer 129 are possible. If the lossy and lossless raster print data streams and the merge data are supplied to the merge unit in a temporally and spatially synchronized manner, then the need for buffering of the print data streams internal to the merge unit 128 is eliminated. For the merge unit implementation for which it is necessary to receive temporally and spatially synchronized print data streams, the buffering of the print data streams, if necessary, could be performed external to the merge unit. Furthermore, with temporal and spatial synchronization between the lossy and lossless raster print data streams and the merge data stream, the merge unit could be significantly simplified to function using the print data multiplexor 24.

Merge data output buffer 53 operates to convert the byte wide stream of merge data into a single bit wide stream synchronized with the lossy or lossless raster print data which represents the corresponding pixel. Although the preferred embodiment of merge unit 128 uses a single bit to select from the bytes of lossy and lossless raster print data, it should be recognized that a multiple bit wide stream may be used to select from more than two raster print data streams and the raster print data streams may use more than eight bits to represent each dimension of the color space.

Figure 5:
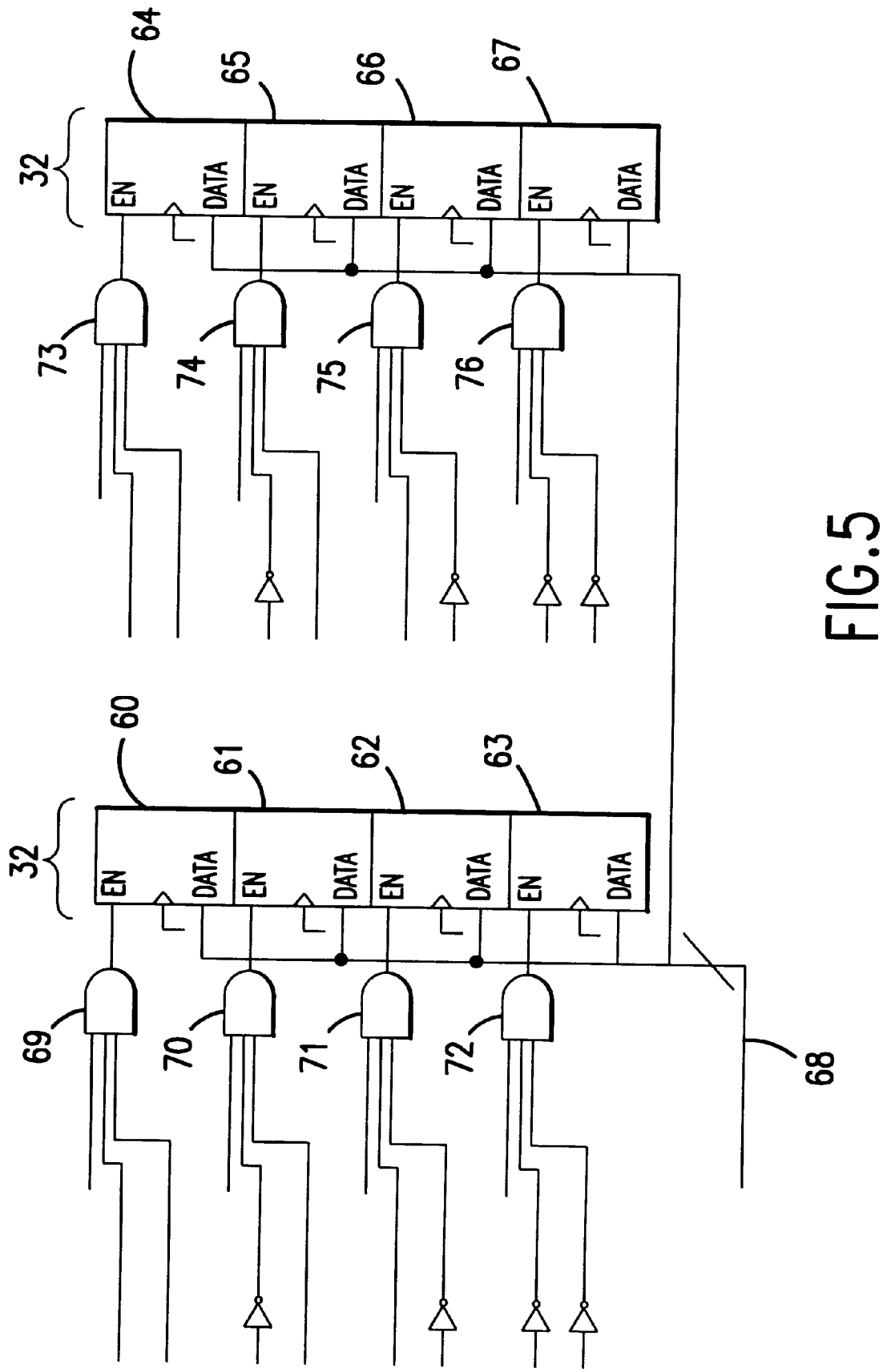
FIG. 5 is a simplified schematic diagram of the input side of the lossy input buffer.

Shown in FIG. 5 is a simplified schematic of the arrangement on the input side of lossy input buffer 32 which is representative of the operation of each of the input buffers 32, 33, 36, 37. The exemplary lossy input buffer 32 is formed from eight, eight bit data latches 60–67. The eight bit input lossy raster print data stream 68 is presented to the "DATA" inputs of each of the eight data latches 60–67. The eight three input AND gates 69–76 connected to the "EN" inputs of the eight data latches 60–67 decode control signals, generated by the color space converter interface controller 38, to select one of the eight data latches 60–67 for loading of a byte of the input print data stream. The decoding logic is part of the color space converter interface controller 38. As is shown in FIG. 5, the eight data latches 60–67 are partitioned into two banks each having four data latches. The decoding of the control signals is done so that four successively transferred bytes of the print data stream are loaded into one of the two banks and the next four successively transferred bytes of the print data stream are loaded into the other of the two banks. Loading input buffers 32, 33, 36, 37 so that successively transferred groups of four bytes of the print data stream are alternately loaded into one of the two banks of data latches maintains the flow of print data through input buffers 32, 33, 36, 37. While one of the two banks is loaded with input print data, transfer of print data out of the other of the two banks can occur.

Figure 6:
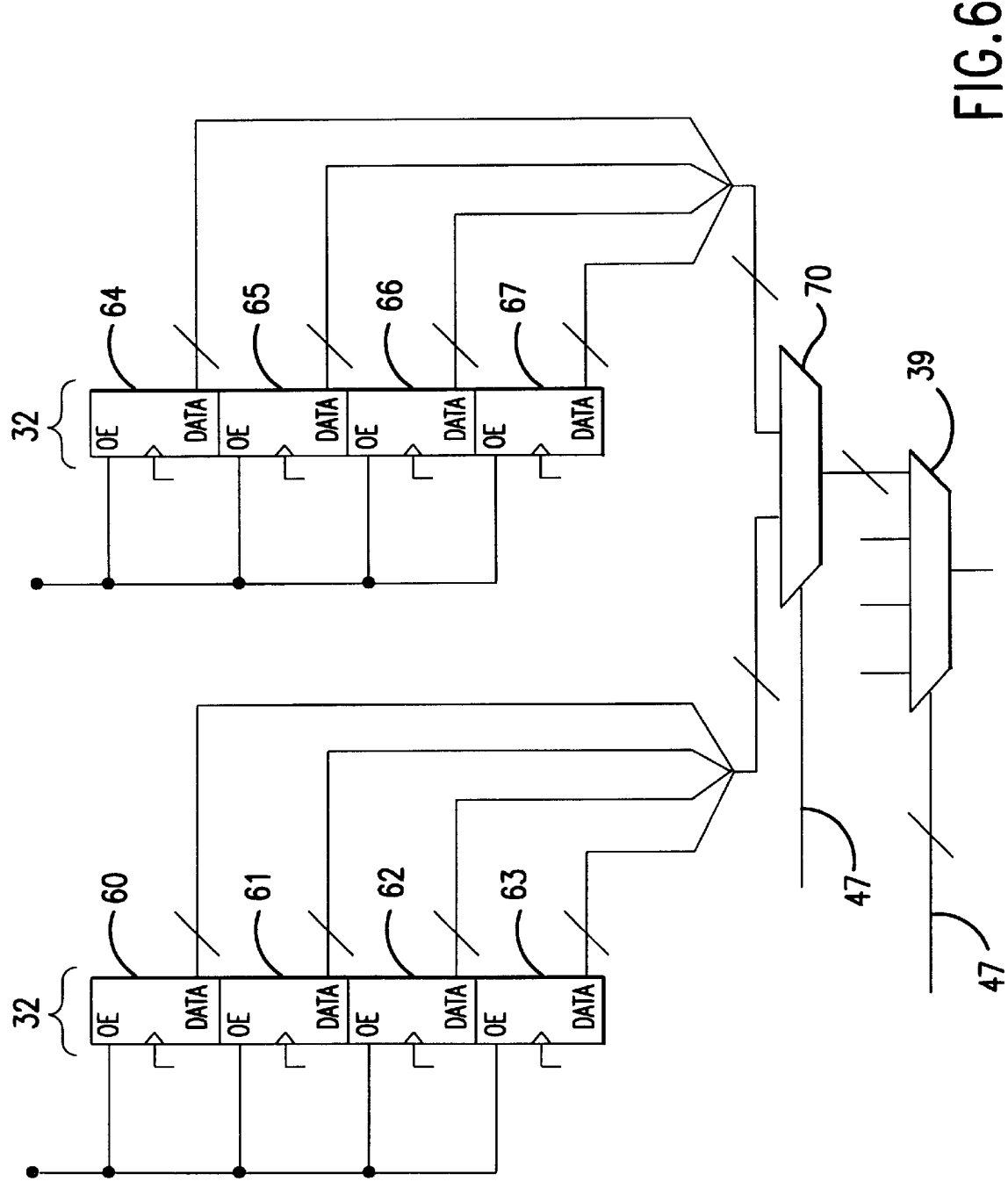
FIG. 6 is a simplified schematic diagram of the output side of lossy input buffer.

Shown in FIG. 6 is a simplified schematic of the arrangement on the output side of lossy input buffer 32 which is representative of the operation of each of the input buffers 32, 33, 36, 37. The "OE" inputs of the eight data latches 60–67 are connected to a fixed logic level so that the lossy raster print data stored in the lossy input buffer 32 is output from the data latches 60–67 on the rising edge of each clock cycle. The four eight bit outputs of each of the two banks of lossy input buffer 32 form two, thirty two bit wide print data streams. These two, thirty two bit wide print data streams are connected to the inputs of multiplexor 70. One of these two, thirty two bit wide print data streams is selected for input to input buffer multiplexor 39. The selection is performed by multiplexor 70 using a control signal generated by the color space converter interface controller 38. This control signal detects which of the two banks of input buffers 32, 33, 36, 37 is full and ready to have the print data contained within it sent to the input buffer multiplexor 39. Transferring print data out of input buffers 32, 33, 36, 37 so that one of the group of four bytes stored in each of the two banks is alternately selected, maintains the flow of print data through input buffers 32, 33, 36, 37 and maintains the flow of print data to input buffer multiplexor 39. While four bytes of print data are transferred out of one of the two banks, loading of four bytes of print data into the other of the two banks can occur.

Figure 7:
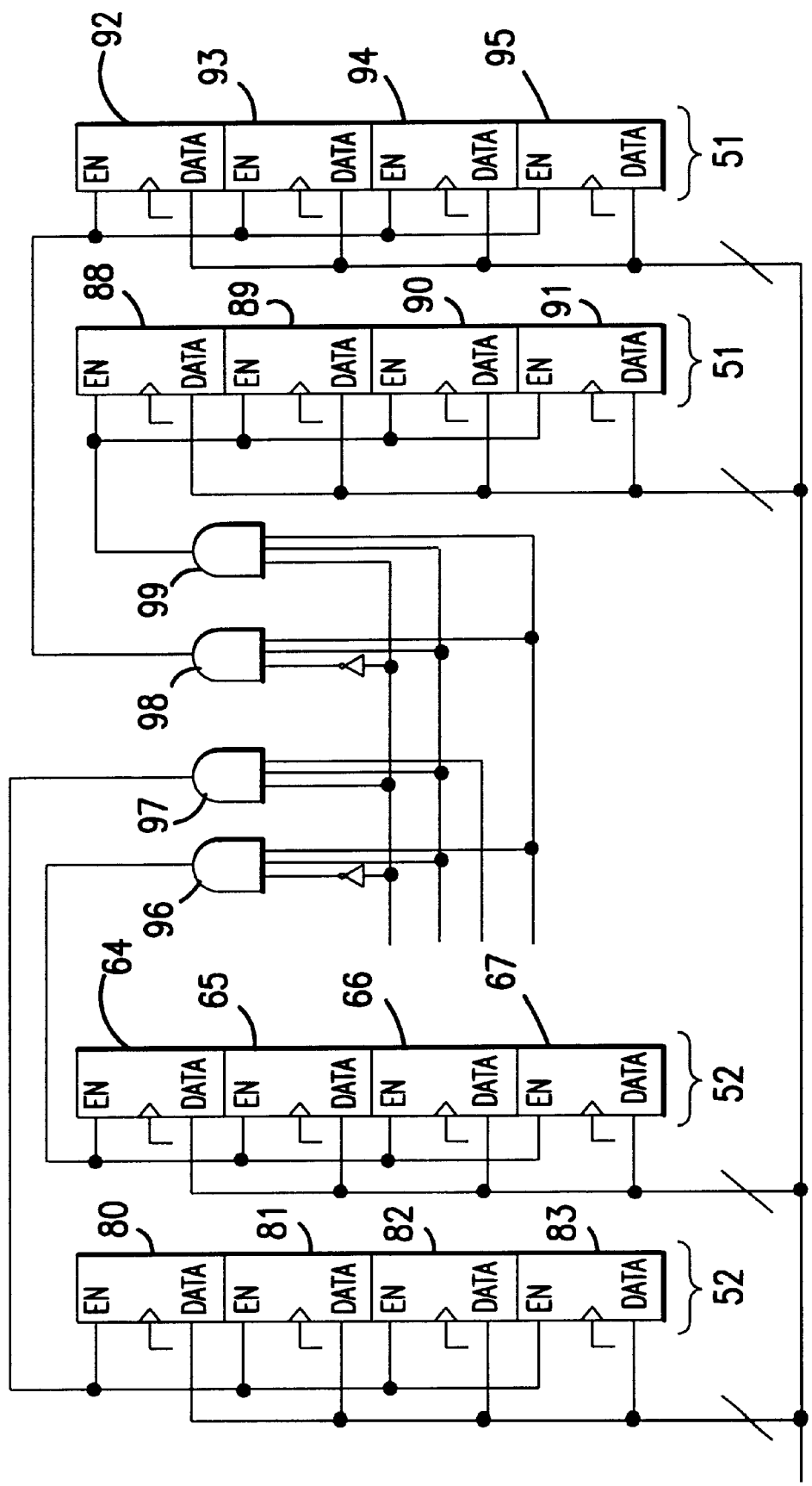
FIG. 7 is a simplified schematic diagram of the input side of the lossy and lossless output buffers.

Shown in FIG. 7 is a simplified schematic of the arrangement of the input side of the lossy output buffer 51 and lossless output buffer 52. Each of the lossy 51 and lossless 52 output buffers includes two banks of four eight bit data latches 80–95. The thirty two bit wide lossy raster print data stream and lossless raster print data stream internal to merge unit 128 are each partitioned into four, eight bit wide lossy or lossless raster print data streams which are presented to the "DATA" inputs of each of the respective data latches 80–95. The "EN" inputs of each of data latches 80–95 control the loading of the lossy and lossless raster print data into the data latches 80–95. The four AND gates 96–99 are part of the halftone interface controller 55 and are used to decode control signals generated by the halftone interface controller 55 which control loading of the data latches 80–95. While lossy and lossless raster print data is loaded into one pair of banks of data latches 80–95, lossy or lossless raster print data can be sent out of the other pair of banks of data latches 80–95. Use of this buffering method maintains the flow of print data through the lossy and lossless output buffers 51, 52.

Figure 8:
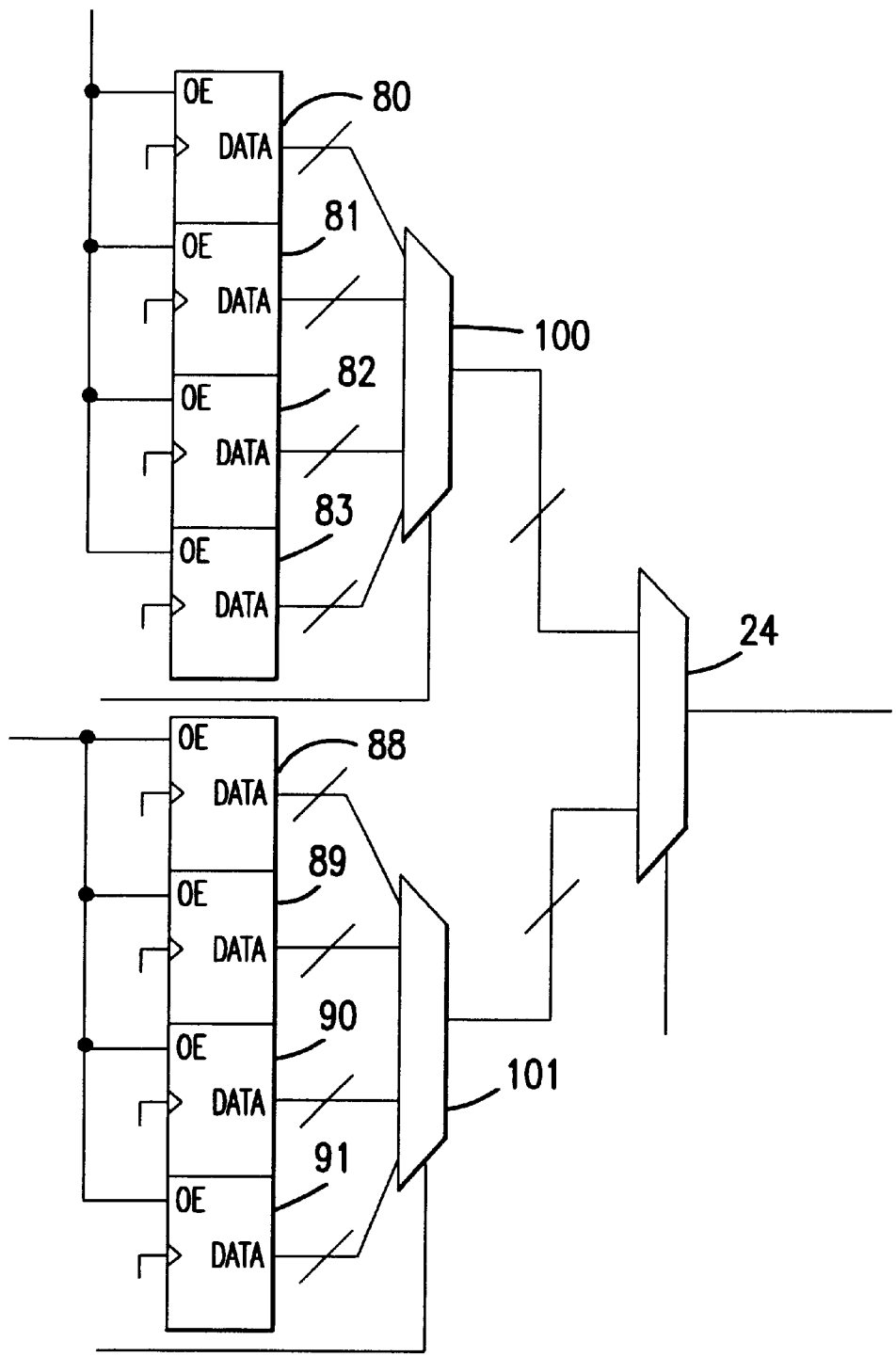
FIG. 8 is a simplified schematic diagram of the output side of the lossy and lossless output buffers.

Shown in FIG. 8 is a simplified schematic of the arrangement of the output side for one pair of lossy and lossless banks of data latches 80–83, 88–91 for lossy 51 and lossless 52 output buffers. The output side for the other two banks of data latches 84–87, 92–95 for lossy 51 and lossless 52 output buffers is implemented similarly. The lossy 51 and lossless 52 output buffers convert the thirty two bit wide input lossy and lossless raster print data stream into an eight bit wide lossy and lossless raster print data stream. The "OE" inputs of the eight data latches 80–83, 88–91 are connected to a fixed logic level so that the lossy and lossless raster print data stored in these data latches 80–83, 88–91 is output on the rising edge of each clock cycle. The multiplexors 100, 101 are used to select one of the eight bit outputs from the respective data latches 80–83, 88–91 for input to print data multiplexor 24. The eight bit outputs from the respective data latches 80–83, 88–91 are selected by the respective multiplexors 100, 101 so that the relative order of the eight bit bytes in the respective lossy and lossless raster print data streams is maintained. This is necessary so that the merge operation 13 performed by print data multiplexor 24 correctly reconstructs the original page. The signals used to control multiplexors 100, 101 are generated by the halftone interface controller 55. The stream of merges bits output by merge output buffer 53 control the selection, by print data multiplexor 24, of eight bit bytes from the lossy and lossless raster print data streams. The raster print data stream emerging from print data multiplexor 24 is eight bits wide and consists of the merged lossy and lossless raster print data streams.

Figure 9:
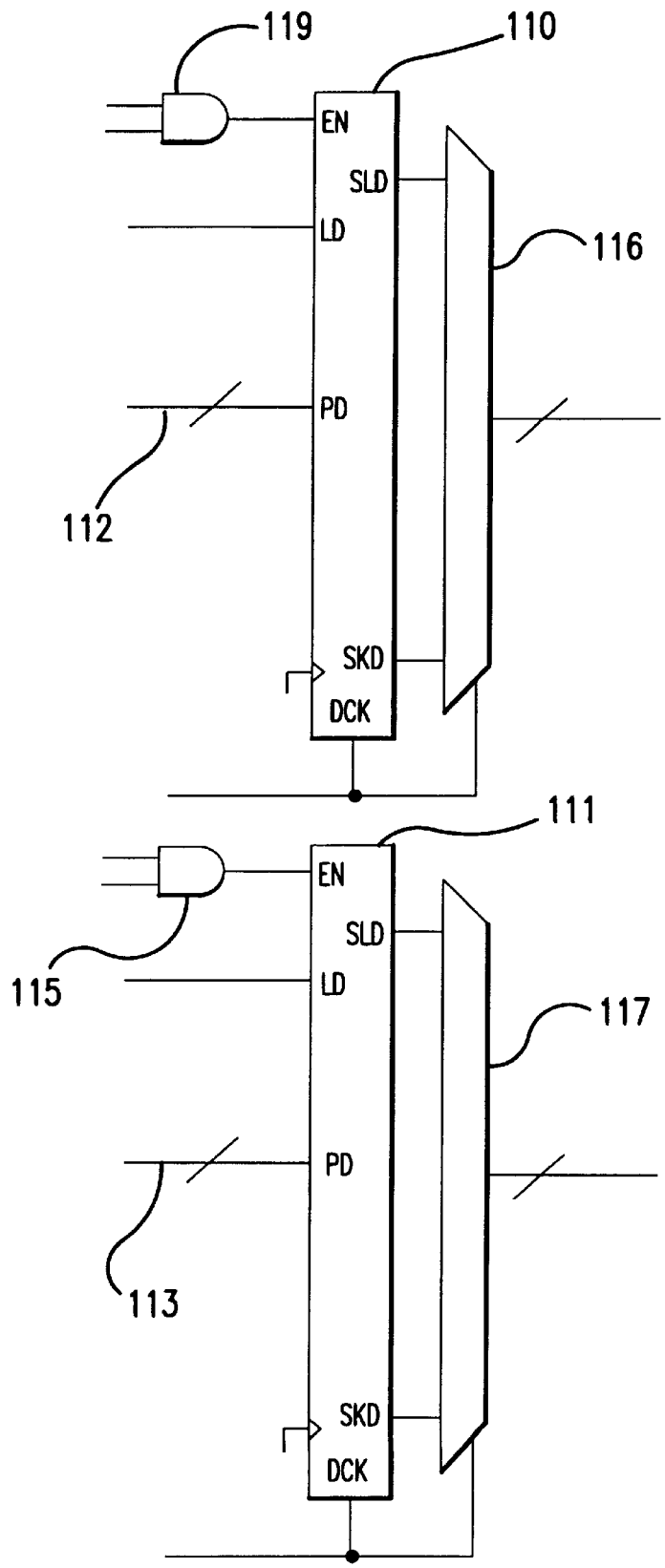
FIG. 9 is a simplified schematic diagram of the shift registers used for the halftone and merge data streams.

Shown in FIG. 9 are simplified schematics of the halftone output shift register 110 and the merge output shift register 111. The thirty two bit wide halftone print data stream 112 and the thirty two bit wide merge print data stream 113 are loaded into the respective output shift registers 110, 111. Signals from the halftone interface controller 55 to the "LD" inputs on each of the output shift registers 110, 111 control loading of the halftone and merge print data. The use of shift registers 110, 111 allows the byte aligned halftone print data and merge print data to be partitioned into, respectively, a two bit wide and a single bit wide stream of print data so that the relative order of these two data streams is maintained with respect to the lossy and lossless raster print data streams.

The AND gates 114, 115, included in halftone interface controller 55, control the shifting of the merge print data and the halftone print data out of their respective shift registers 110, 111. When the "EN" inputs of the shift registers 110, 111 are asserted, the respective registers will shift out merge print data and halftone print data. Depending upon the level of the "DIR" input to the shift registers 110, 111, the merge and halftone print data will be shifted out of the "SLD" or "SRD" output on the rising edge of the clock. The "DIR" input controls the direction of the shifting of the merge and halftone print data in the registers 110, 111 so that the relative order of the merge and halftone print data streams is maintained relative to the lossy and lossless raster print data streams. Depending upon how the merge and halftone bits are ordered, with respect to the least and most significant bits of the thirty two bits, when they are formed into their respective thirty two bit wide print data streams internal to merge unit 128, the "DIR" inputs will be controlled to maintain spatial synchronization with the lossy and lossless print data streams.

The halftone print data stream shifted out of shift register 110 is two bits wide and the merge print data stream shifted out of shift register 111 is a single bit wide. Multiplexors 116, 117 are controlled by the same signal which is connected to the "DIR" inputs of shift registers 110, 111 to select the "SRD" or "SLD" outputs of the shift registers 110, 111 to output from the multiplexors 116, 117. The single bit wide stream of merge print data output from multiplexor 117 is connected to the control input of print data multiplexor 24 to select, pixel by pixel, from the lossy or lossless raster print data streams. The output print data from the merge unit 128 includes the eight bit wide merged raster print data stream output from buffer multiplexor 24 and the two bit wide halftone print data stream output from multiplexor 116.

Although several embodiments of the invention have been illustrated, and their forms described, it is readily apparent to those of ordinary skill in the art that various modifications may be made therein without departing from the spirit of the invention or from the scope of the appended claims.

What is claimed is:

1. In a data processing pipeline for separately processing lossy data and lossless data, a merge unit for merging said lossy data and said lossless data into output data using merge data defined by said lossy data and said lossless data and formed of merge data corresponding to said lossy data and said lossless data, said merge unit comprising:
   a first buffer;
   a second buffer;
   a third buffer;
   a memory for storing said lossy data, said lossless data and said merge data;
   a memory controller coupled to said memory, said memory controller configured to receive said lossy data, said lossless data, and said merge data and configured to store and load said lossy data, said lossless data, and said merge data to and from said memory, said memory controller configured to send said lossy data to said first buffer, said lossless data to said second buffer, and said merge data to said third buffer;
   a first multiplexor configured to receive said lossy data from said first buffer, said lossless data from said second buffer and said merge data from said third buffer, said first multiplexor for selecting from said lossy data and said lossless data, responsive to said merge data, to form said output data.

2. The merge unit as recited in claim 1, further comprising:
   a second multiplexor coupled to said memory controller; said second multiplexor configured to receive said lossy data, said lossless data, and said merge data and to select therefrom to send to said memory controller;
   a fourth buffer coupled to said second multiplexor and configured to receive said lossy data and send said lossy data to said second multiplexor;
   a fifth buffer coupled to said second multiplexor and configured to receive said lossless data and send said lossless data to said second multiplexor; and
   a sixth buffer coupled to said second multiplexor and configured to receive said merge data and send said merge data to said second multiplexor.

3. The merge unit as recited in claim 2, further comprising:
   a first interface controller coupled to said fourth, said fifth, and said sixth buffers, said second multiplexor, and said memory controller, said first interface controller to generate a first set of signals to control the flow of said lossy, said lossless and said merge data into and from said fourth, said fifth, and said sixth buffers through said second multiplexor and into said memory controller.

4. The merge unit as recited in claim 3, wherein:
   each of said fourth, said fifth, and said sixth buffers includes a first and a second set of data latches to alternately receive and send the respective of said lossy data, said lossless data, and said merge data.

5. The merge unit as recited in claim 4, further comprising:
   a second interface controller coupled to said first, said second, and said third buffers, said first multiplexor, and said memory controller, said second interface controller to generate a second set of signals to control the flow of said lossy data, said lossless data and said merge data from said memory controller through said first, said second, and said third buffers and into said first multiplexor.

6. The merge unit as recited in claim 5, wherein:
   each of said first and said second buffers includes a third and a fourth set of data latches to alternately receive and send the respective of said lossy data and said lossless data.

7. The merge unit as recited in claim 6, wherein:
   said third buffer includes a shift register to convert said merge data to merge bits, said merge bits control selection of said lossy data and said lossless data for said output data from said first multiplexor.

8. A print data processing pipeline for processing lossless print data and lossy print data using merge data, comprising:
   a lossless compressor/decompressor configured to receive said lossless print data to generate compressed lossless print data and configured to receive said compressed lossless print data to generate decompressed lossless print data;
   a lossy compressor/decompressor configured to receive said lossy print data to generate compressed lossy print data and configured to receive said compressed lossy print data to generate decompressed lossy print data; and
   a merge unit configured to receive said decompressed lossless print data and said decompressed lossy print data to generate merged print data using said merge data, said merge unit includes a first buffer, a second buffer, a third buffer, a memory for storing said decompressed lossless print data, said decompressed lossy print data and said merge data, a memory controller coupled to said memory, said memory controller configured to receive said decompressed lossless print data, said decompressed lossy print data, and said merge data and configured to store and load said decompressed lossless print data, said decompressed lossy print data, and said merge data to and from said memory, said memory controller configured to send said decompressed lossless print data to said first buffer, said decompressed lossy print data to said second buffer, and said merge data to said third buffer, and a first multiplexor configured to receive said decompressed lossless print data from said first buffer, said decompressed lossy print data from said second buffer and said merge data from said third buffer, said first multiplexor for selecting from said decompressed lossless print data and said decompressed lossy print data, responsive to said merge data, to form said merged print data.

9. The print data processing pipeline as recited in claim 8, wherein:
   said lossless compressor/decompressor includes capability for receiving said merge data to generate compressed merge data and includes capability for receiving said compressed merge data to generate decompressed merge data; and
   said merge unit includes a second multiplexor coupled to said memory controller; said second multiplexor configured to receive said decompressed lossless print data, said decompressed lossy print data, and said merge data, to select therefrom to send to said memory controller.

10. The print data processing pipeline as recited in claim 9, wherein:
    said merge unit includes a fourth buffer coupled to said second multiplexor and configured to receive said decompressed lossless print data and send said decompressed lossless print data to said second multiplexor;
    said merge unit includes a fifth buffer coupled to said second multiplexor and configured to receive said decompressed lossy print data and send said decompressed lossy print data to said second multiplexor; and
    said merge unit includes a sixth buffer coupled to said second multiplexor and configured to receive said merge data and send said merge data to said second multiplexor.

11. The print data processing pipeline as recited in claim 10, wherein:
    said merge unit includes a first interface controller coupled to said fourth, said fifth, and said sixth buffers, said second multiplexor, and said memory controller, said first interface controller for generating a first set of signals to control the flow of said decompressed lossless print data, said decompressed lossy print data, and said merge data into and from said fourth, said fifth, and said sixth buffers through said second multiplexor and into said memory controller; and
    each of said fourth, said fifth, and said sixth buffers includes a first and a second set of data latches to alternately receive and send the respective of said decompressed lossless print data, said decompressed lossy print data, and said merge data.

12. The print data processing pipeline as recited in claim 11, wherein:
    said merge unit includes a second interface controller coupled to said first, said second, and said third buffers, said first multiplexor, and said memory controller, said second interface controller for generating a second set of signals to control the flow of said decompressed lossless print data, said decompressed lossy print data, and said merge data, from said memory controller through, respectively, said first, said second, and said third buffers into said first multiplexor; and
    each of said first and said second buffers includes a third and a fourth set of data latches to alternately receive and send the respective of said decompressed lossless print data and said decompressed lossy print data.

13. The print data processing pipeline as recited in claim 12, wherein:
    said merge unit includes capability to receive said lossless print data, said lossy print data, and said decompressed merge data to use interchangeably with, respectively said decompressed lossless print data, said decompressed lossy print data, and said merge data to form said merged print data; and
    said third buffer includes a shift register to convert said merge data into merge bits to control the selection of said decompressed lossless print data and said decompressed lossy print data in said first multiplexor.

14. A printer, comprising:
    a processor to generate lossless print data, lossy print data, and merge data from print data;
    a direct memory access controller operatively coupled to said processor, said direct memory access controller configured to receive at least one of said lossless print data, said lossy print data, and said merge data from said processor and configured to send at least one of said lossless print data, said lossy print data, and said merge data;
    a lossless compressor/decompressor coupled to said direct memory access controller, said lossless compressor/decompressor configured to receive said lossless print data to generate compressed lossless print data and said lossless compressor/decompressor configured to receive said compressed lossless print data to generate decompressed lossless print data;
    a lossy compressor/decompressor coupled to said direct memory access controller, said lossy compressor/decompressor configured to receive said lossy print data to generate compressed lossy print data and said lossy compressor/decompressor configured to receive said compressed lossy print data to generate decompressed lossy print data; and
    a merge unit configured to receive said decompressed lossless print data and said decompressed lossy print data to generate merged print data using said merge data, said merge unit includes a first buffer, a second buffer, a third buffer, a memory for storing said decompressed lossless print data, said decompressed lossy print data and said merge data, a memory controller coupled to said memory, said memory controller configured to receive said decompressed lossless print data, said decompressed lossy print data, and said merge data and configured to store and load said decompressed lossless print data, said decompressed lossy print data, and said merge data to and from said memory, said memory controller configured to send said decompressed lossless print data to said first buffer, said decompressed lossy print data to said second buffer, and said merge data to said third buffer, and a first multiplexor configured to receive said decompressed lossless print data from said first buffer, said decompressed lossy print data from said second buffer and said merge data from said third buffer, said first multiplexor for selecting from said decompressed lossless print data and said decompressed lossy print data, responsive to said merge data, to form said merged print data.

15. The printer as recited in claim 14, wherein:
    said lossless compressor/decompressor includes a lossless compressed output coupled to said direct memory access controller and a lossless decompressed output, said lossless compressor/decompressor includes capability to receive said merge data to generate compressed merge data and to receive said compressed merge data to generate decompressed merge data;

said lossy compressor/decompressor includes a lossy compressed output coupled to said direct memory access controller and a lossy decompressed output; and said merge unit includes capability to receive said lossless print data, said lossy print data, and said merge data to generate said merged print data and said merge unit includes capability to receive said decompressed lossless print data, said decompressed lossy print data, and said decompressed merge data to generate said merged print data.

16. The printer as recited in claim 15, further comprising:

a page strip manager coupled to said lossless decompressed output, said lossy decompressed output, and said direct memory access controller, said page strip manager having a first lossless output, a first lossy output, and a merge data output coupled to said merge unit;

a color space converter coupled to said first lossless output and said first lossy output, said color space converter having a second lossless output and a second lossy output coupled to said merge unit; and a halftone unit coupled to said merge unit to receive said merged print data and to perform a halftone operation on said merged print data responsive to halftone data.

17. The printer as recited in claim 16, wherein:

said color space converter includes capability to bypass said lossless print data, said decompressed lossless print data, said lossy print data, and said decompressed lossy print data through said color space converter;

said color space converter includes a selector having a selector output coupled to said direct memory access controller for selecting from said lossless print data and said lossy print data or from said decompressed lossless print data and said decompressed lossy print data; and said page strip manager includes capability to format at least one of said lossless print data, said decompressed lossless print data, said lossy print data, and said decompressed lossy print data for subsequent processing operations.

* * * * *